United States Patent
Zbiciak

(12) 
(10) Patent No.: US 11,481,327 B2
(45) Date of Patent: Oct. 25, 2022

(54) STREAMING ENGINE WITH FLEXIBLE STREAMING ENGINE TEMPLATE SUPPORTING DIFFERING NUMBER OF NESTED LOOPS WITH CORRESPONDING LOOP COUNTS AND LOOP OFFSETS

(71) Applicant: TEXAS INSTRUMENTS INCORPORATED, Dallas, TX (US)

(72) Inventor: Joseph Zbiciak, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/146,576

(22) Filed: Jan. 12, 2021

(65) Prior Publication Data
US 2021/0133106 A1    May 6, 2021

Related U.S. Application Data

(63) Continuation of application No. 16/459,210, filed on Jul. 1, 2019, now Pat. No. 10,891,231, which is a
(Continued)

(51) Int. Cl.
*G06F 12/08* (2016.01)
*G06F 12/0815* (2016.01)
(Continued)

(52) U.S. Cl.
CPC ........ *G06F 12/0815* (2013.01); *G06F 9/3001* (2013.01); *G06F 9/3012* (2013.01); *G06F 9/3013* (2013.01); *G06F 9/30036* (2013.01); *G06F 9/30047* (2013.01); *G06F 9/30072* (2013.01); *G06F 9/30145* (2013.01); *G06F 9/345* (2013.01); *G06F 9/383* (2013.01); *G06F 9/3822* (2013.01); *G06F 9/3853* (2013.01); *G06F 9/3887* (2013.01); *G06F 12/0862* (2013.01); *G06F 12/0875* (2013.01); *G06F 12/0897* (2013.01); *G06F 9/30065* (2013.01); *G06F 9/325* (2013.01); *G06F 15/8007* (2013.01); *G06F 2212/452* (2013.01);
(Continued)

(58) Field of Classification Search
None
See application file for complete search history.

(56) References Cited

U.S. PATENT DOCUMENTS 5,640,578 A    6/1997  Balmer et al.
6,829,696 B1   12/2004 Balmer et al.
(Continued)

*Primary Examiner* — Eric Coleman
(74) *Attorney, Agent, or Firm* — Brian D. Graham; Charles A. Brill; Frank D. Cimino

(57) ABSTRACT

A streaming engine employed in a digital data processor specifies a fixed read only data stream defined by plural nested loops. An address generator produces address of data elements for the nested loops. A steam head register stores data elements next to be supplied to functional units for use as operands. A stream template specifies loop count and loop dimension for each nested loop. A format definition field in the stream template specifies the number of loops and the stream template bits devoted to the loop counts and loop dimensions. This permits the same bits of the stream template to be interpreted differently enabling trade off between the number of loops supported and the size of the loop counts and loop dimensions.

20 Claims, 21 Drawing Sheets

Related U.S. Application Data continuation of application No. 15/384,487, filed on Dec. 20, 2016, now Pat. No. 10,339,057.

(51) Int. Cl.

| | |
|---|---|
| *G06F 12/0875* | (2016.01) |
| *G06F 12/0897* | (2016.01) |
| *G06F 9/30* | (2018.01) |
| *G06F 9/345* | (2018.01) |
| *G06F 9/38* | (2018.01) |
| *G06F 12/0862* | (2016.01) |
| *G06F 15/80* | (2006.01) |
| *G06F 9/32* | (2018.01) |

(52) U.S. Cl.
  CPC .............. *G06F 2212/454* (2013.01); *G06F 2212/6026* (2013.01); *G06F 2212/621* (2013.01)

(56) References Cited

U.S. PATENT DOCUMENTS

| | | | |
|---|---|---|---|
| 6,832,296 B2 | 12/2004 | Hooker | |
| 9,170,811 B2* | 10/2015 | Mudawar | G06F 9/30149 |
| 9,606,803 B2 | 3/2017 | Anderson et al. | |
| 9,740,484 B2* | 8/2017 | Gopal | G06F 9/30018 |
| 2004/0261067 A1 | 12/2004 | Komatsu et al. | |
| 2005/0015537 A1 | 1/2005 | Asaad et al. | |
| 2005/0273769 A1* | 12/2005 | Eichenberger | G06F 8/4452 717/136 |
| 2005/0283589 A1 | 12/2005 | Matsuo | |
| 2006/0212654 A1 | 9/2006 | Balakrishnan | |
| 2009/0138661 A1 | 5/2009 | Lauterbach | |
| 2009/0189896 A1 | 7/2009 | Jiao et al. | |
| 2011/0029962 A1* | 2/2011 | Nuzman | G06F 8/452 717/160 |
| 2013/0185540 A1* | 7/2013 | Hung | G06F 15/8053 712/7 |
| 2013/0326201 A1* | 12/2013 | Gopal | G06F 9/30043 712/225 |
| 2014/0188961 A1* | 7/2014 | Plotnikov | G06F 9/3455 708/201 |
| 2014/0281369 A1* | 9/2014 | Jha | G06F 9/30018 712/4 |
| 2015/0019840 A1* | 1/2015 | Anderson | G06F 9/30098 712/206 |
| 2017/0308381 A1 | 10/2017 | Zbiciak | |
| 2018/0173532 A1 | 6/2018 | Zbiciak | |

* cited by examiner

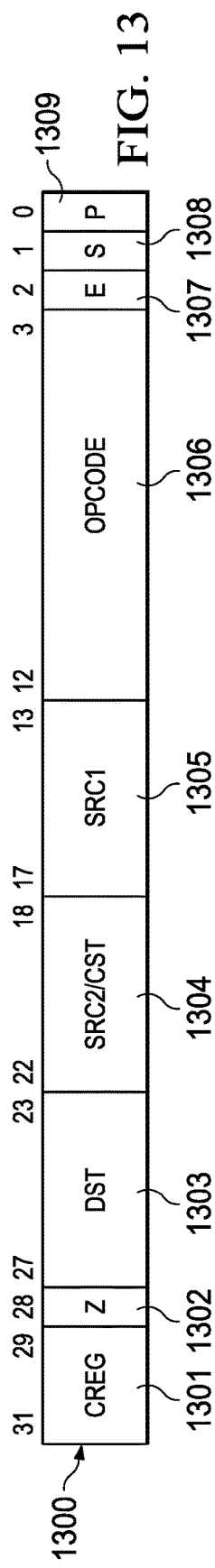
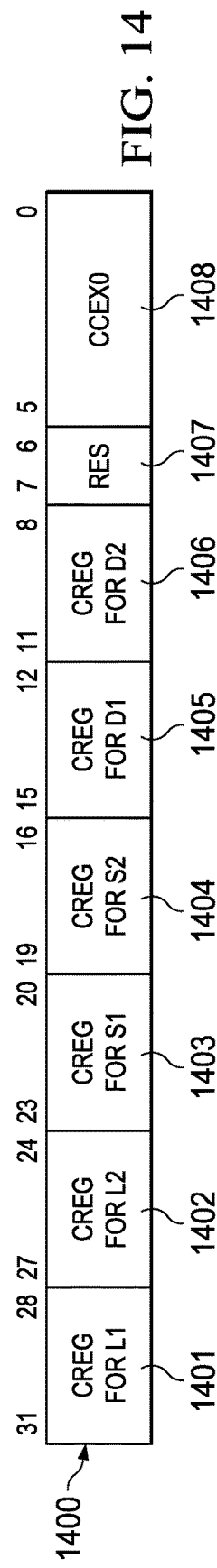
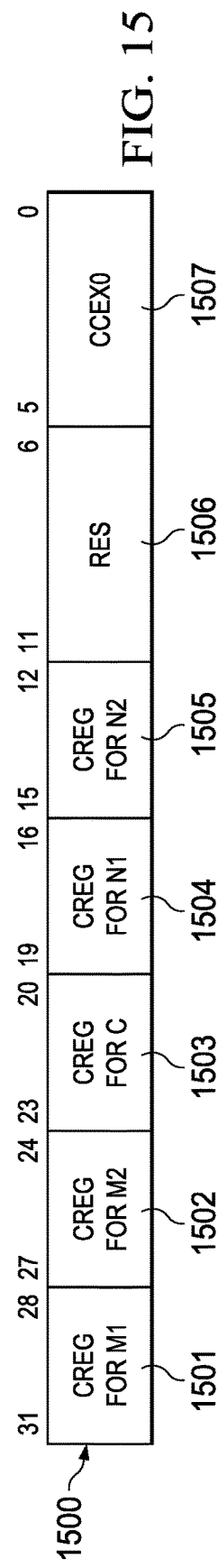
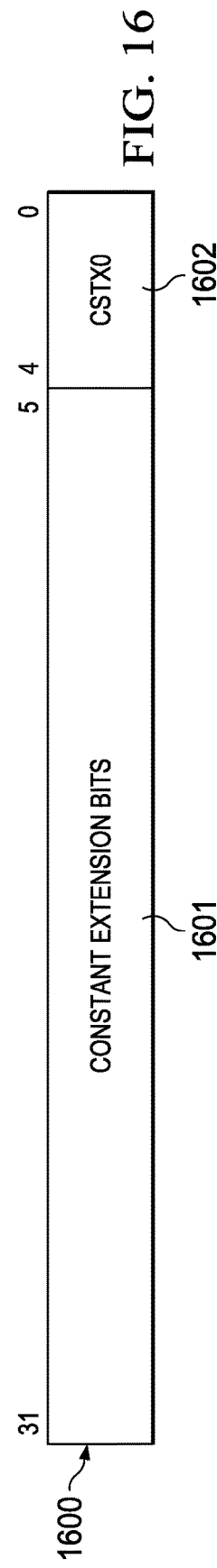

STREAMING ENGINE WITH FLEXIBLE STREAMING ENGINE TEMPLATE SUPPORTING DIFFERING NUMBER OF NESTED LOOPS WITH CORRESPONDING LOOP COUNTS AND LOOP OFFSETS

CROSS-REFERENCE TO RELATED APPLICATIONS

This application is a continuation of U.S. patent application Ser. No. 16/459,210, filed Jul. 1, 2019, which is a continuation of U.S. patent application Ser. No. 15/384,487, filed Dec. 20, 2016, each of which is incorporated herein by reference in its entirety.

This application is an improvement over U.S. patent application Ser. No. 14/331,986, filed Jul. 15, 2014, which claims priority from U.S. Provisional Patent Application No. 61/846,148, filed Jul. 15, 2013, each of which is incorporated herein by reference in its entirety.

TECHNICAL FIELD

The technical field of this invention is digital data processing and more specifically control of streaming engine used for operand fetching.

BACKGROUND

Modern digital signal processors (DSP) faces multiple challenges. Workloads continue to increase, requiring increasing bandwidth. Systems on a chip (SOC) continue to grow in size and complexity. Memory system latency severely impacts certain classes of algorithms. As transistors get smaller, memories and registers become less reliable. As software stacks get larger, the number of potential interactions and errors becomes larger.

Memory bandwidth and scheduling are a problem for digital signal processors operating on real-time data. Digital signal processors operating on real-time data typically receive an input data stream, perform a filter function on the data stream (such as encoding or decoding) and output a transformed data stream. The system is called real-time because the application fails if the transformed data stream is not available for output when scheduled. Typical video encoding requires a predictable but non-sequential input data pattern. Often the corresponding memory accesses are difficult to achieve within available address generation and memory access resources. A typical application requires memory access to load data registers in a data register file and then supply to functional units which perform the data processing.

SUMMARY

This invention is a streaming engine employed in a digital signal processor. A fixed data stream sequence is specified by storing corresponding parameters in a control register. The data stream includes plural nested loops. Once started the data stream is read only and cannot be written. A functional unit using the stream data has a first instruction type that only reads the data and a second instruction type both reads the data and causes the streaming engine to advance the stream. This generally corresponds to the needs of a real-time filtering operation.

The streaming engine includes an address generator which produces address of data elements and a steam head register which stores data elements next to be supplied to functional units for use as operands. Each of the plural nested loops has a specified loop count and loop dimension. A stream template specifies loop count and loop dimension for each nested loop. A format definition field in the stream template specifies the number of loops and the stream template bits devoted to the loop counts and loop dimensions. This permits the same bits of the stream template to be interpreted differently enabling tradeoff between the number of loops supported and the size of the loop counts and loop dimensions.

The preferred embodiment includes two independently defined data streams. The two data streams may be independently read or read/advances by a set of very long instruction word (VLIW) functional units.

BRIEF DESCRIPTION OF THE DRAWINGS

These and other aspects of this invention are illustrated in the drawings, in which:

FIG. 13 illustrates an example of the instruction coding of instructions used by this invention;

FIG. 14 illustrates the bit coding of a condition code extension slot 0;

FIG. 15 illustrates the bit coding of a condition code extension slot 1;

FIG. 16 illustrates the bit coding of a constant extension slot 0;

FIG. 28 illustrates a stream template register of this invention;

FIG. 29 illustrates sub-field definitions of the flags field of the stream template register of this invention;

DETAILED DESCRIPTION

Figure 1:
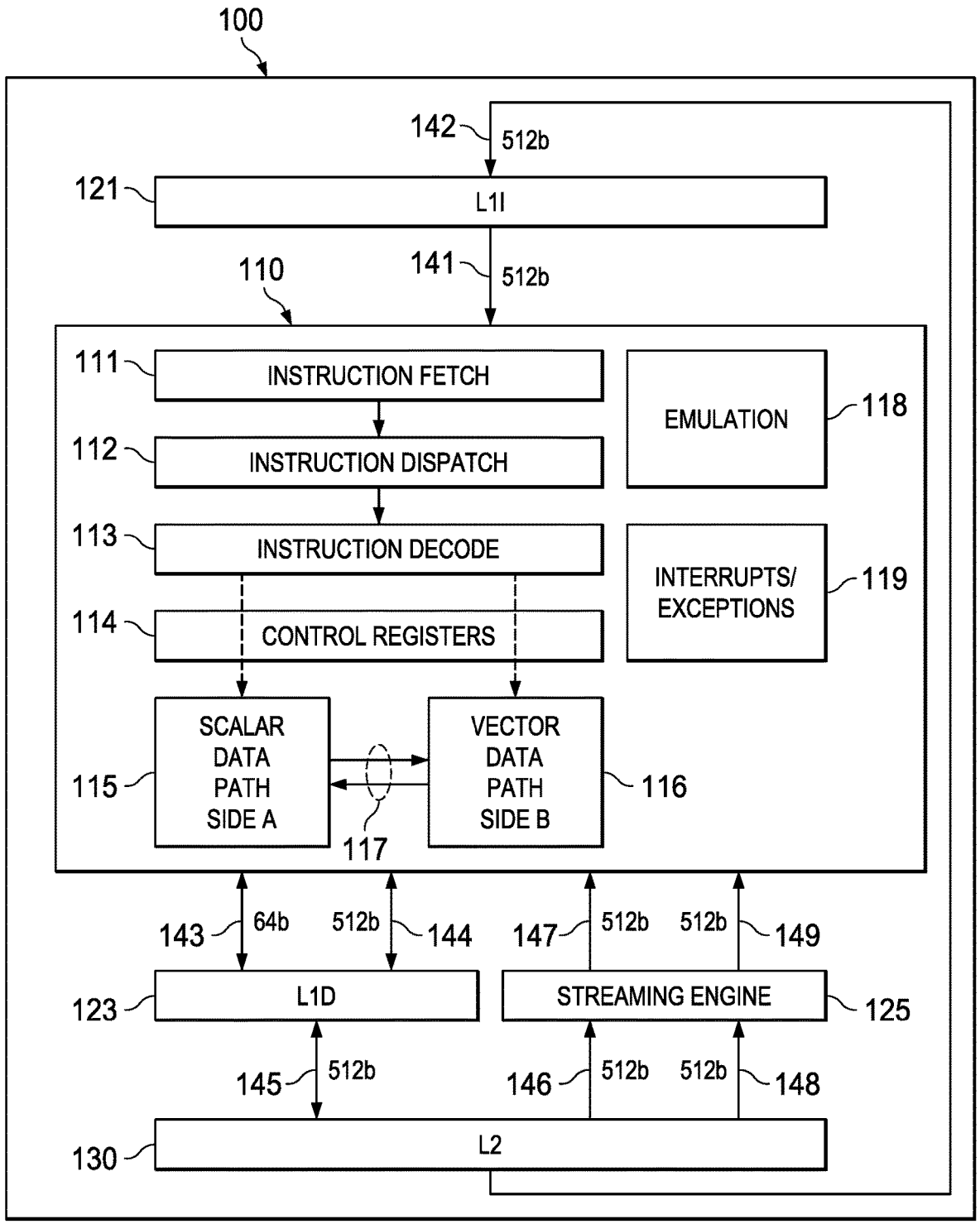
FIG. 1 illustrates a dual scalar/vector datapath processor according to one embodiment of this invention.

FIG. 1 illustrates a dual scalar/vector datapath processor according to a preferred embodiment of this invention. Processor 100 includes separate level one instruction cache (L1I) 121 and level one data cache (L1D) 123. Processor 100 includes a level two combined instruction/data cache (L2) 130 that holds both instructions and data. FIG. 1 illustrates connection between level one instruction cache 121 and level two combined instruction/data cache 130 (bus 142). FIG. 1 illustrates connection between level one data cache 123 and level two combined instruction/data cache 130 (bus 145). In the preferred embodiment of processor 100 level two combined instruction/data cache 130 stores both instructions to back up level one instruction cache 121 and data to back up level one data cache 123. In the preferred embodiment level two combined instruction/data cache 130 is further connected to higher level cache and/or main memory in a manner not illustrated in FIG. 1. In the preferred embodiment central processing unit core 110, level one instruction cache 121, level one data cache 123 and level two combined instruction/data cache 130 are formed on a single integrated circuit. This signal integrated circuit optionally includes other circuits.

Central processing unit core 110 fetches instructions from level one instruction cache 121 as controlled by instruction fetch unit 111. Instruction fetch unit 111 determines the next instructions to be executed and recalls a fetch packet sized set of such instructions. The nature and size of fetch packets are further detailed below. As known in the art, instructions are directly fetched from level one instruction cache 121 upon a cache hit (if these instructions are stored in level one instruction cache 121). Upon a cache miss (the specified instruction fetch packet is not stored in level one instruction cache 121), these instructions are sought in level two combined cache 130. In the preferred embodiment the size of a cache line in level one instruction cache 121 equals the size of a fetch packet. The memory locations of these instructions are either a hit in level two combined cache 130 or a miss. A hit is serviced from level two combined cache 130. A miss is serviced from a higher level of cache (not illustrated) or from main memory (not illustrated). As is known in the art, the requested instruction may be simultaneously supplied to both level one instruction cache 121 and central processing unit core 110 to speed use.

In the preferred embodiment of this invention, central processing unit core 110 includes plural functional units to perform instruction specified data processing tasks. Instruction dispatch unit 112 determines the target functional unit of each fetched instruction. In the preferred embodiment central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In the preferred embodiment instruction dispatch unit 112 may operate on plural instructions in parallel. The number of such parallel instructions is set by the size of the execute packet. This will be further detailed below.

One part of the dispatch task of instruction dispatch unit 112 is determining whether the instruction is to execute on a functional unit in scalar datapath side A 115 or vector datapath side B 116. An instruction bit within each instruction called the s bit determines which datapath the instruction controls. This will be further detailed below.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result of this decoding is signals for control of the target functional unit to perform the data processing operation specified by the corresponding instruction on the specified data.

Central processing unit core 110 includes control registers 114. Control registers 114 store information for control of the functional units in scalar datapath side A 115 and vector datapath side B 116 in a manner not relevant to this invention. This information could be mode information or the like.

The decoded instructions from instruction decode 113 and information stored in control registers 114 are supplied to scalar datapath side A 115 and vector datapath side B 116. As a result functional units within scalar datapath side A 115 and vector datapath side B 116 perform instruction specified data processing operations upon instruction specified data and store the results in an instruction specified data register or registers. Each of scalar datapath side A 115 and vector datapath side B 116 includes plural functional units that preferably operate in parallel. These will be further detailed below in conjunction with FIG. 2. There is a datapath 117 between scalar datapath side A 115 and vector datapath side B 116 permitting data exchange.

Central processing unit core 110 includes further non-instruction based modules. Emulation unit 118 permits determination of the machine state of central processing unit core 110 in response to instructions. This capability will typically be employed for algorithmic development. Interrupts/exceptions unit 119 enable central processing unit core 110 to be responsive to external, asynchronous events (interrupts) and to respond to attempts to perform improper operations (exceptions).

Central processing unit core 110 includes streaming engine 125. Streaming engine 125 supplies two data streams from predetermined addresses typically cached in level two combined cache 130 to register files of vector datapath side B. This provides controlled data movement from memory (as cached in level two combined cache 130) directly to functional unit operand inputs. This is further detailed below.

FIG. 1 illustrates exemplary data widths of busses between various parts. Level one instruction cache 121 supplies instructions to instruction fetch unit 111 via bus 141. Bus 141 is preferably a 512-bit bus. Bus 141 is unidirectional from level one instruction cache 121 to central processing unit core 110. Level two combined cache 130 supplies instructions to level one instruction cache 121 via bus 142. Bus 142 is preferably a 512-bit bus. Bus 142 is unidirectional from level two combined cache 130 to level one instruction cache 121.

Level one data cache 123 exchanges data with register files in scalar datapath side A 115 via bus 143. Bus 143 is preferably a 64-bit bus. Level one data cache 123 exchanges data with register files in vector datapath side B 116 via bus 144. Bus 144 is preferably a 512-bit bus. Busses 143 and 144 are illustrated as bidirectional supporting both central processing unit core 110 data reads and data writes. Level one data cache 123 exchanges data with level two combined cache 130 via bus 145. Bus 145 is preferably a 512-bit bus. Bus 145 is illustrated as bidirectional supporting cache service for both central processing unit core 110 data reads and data writes.

Level two combined cache 130 supplies data of a first data stream to streaming engine 125 via bus 146. Bus 146 is preferably a 512-bit bus. Streaming engine 125 supplies data of this first data stream to functional units of vector datapath side B 116 via bus 147. Bus 147 is preferably a 512-bit bus. Level two combined cache 130 supplies data of a second data stream to streaming engine 125 via bus 148. Bus 148 is preferably a 512-bit bus. Streaming engine 125 supplies data of this second data stream to functional units of vector datapath side B 116 via bus 149. Bus 149 is preferably a 512-bit bus. Busses 146, 147, 148 and 149 are illustrated as unidirectional from level two combined cache 130 to streaming engine 125 and to vector datapath side B 116 in accordance with the preferred embodiment of this invention.

In the preferred embodiment of this invention, both level one data cache 123 and level two combined cache 130 may be configured as selected amounts of cache or directly addressable memory in accordance with U.S. Pat. No. 6,606,686 entitled UNIFIED MEMORY SYSTEM ARCHITECTURE INCLUDING CACHE AND DIRECTLY ADDRESSABLE STATIC RANDOM ACCESS MEMORY.

Figure 2:
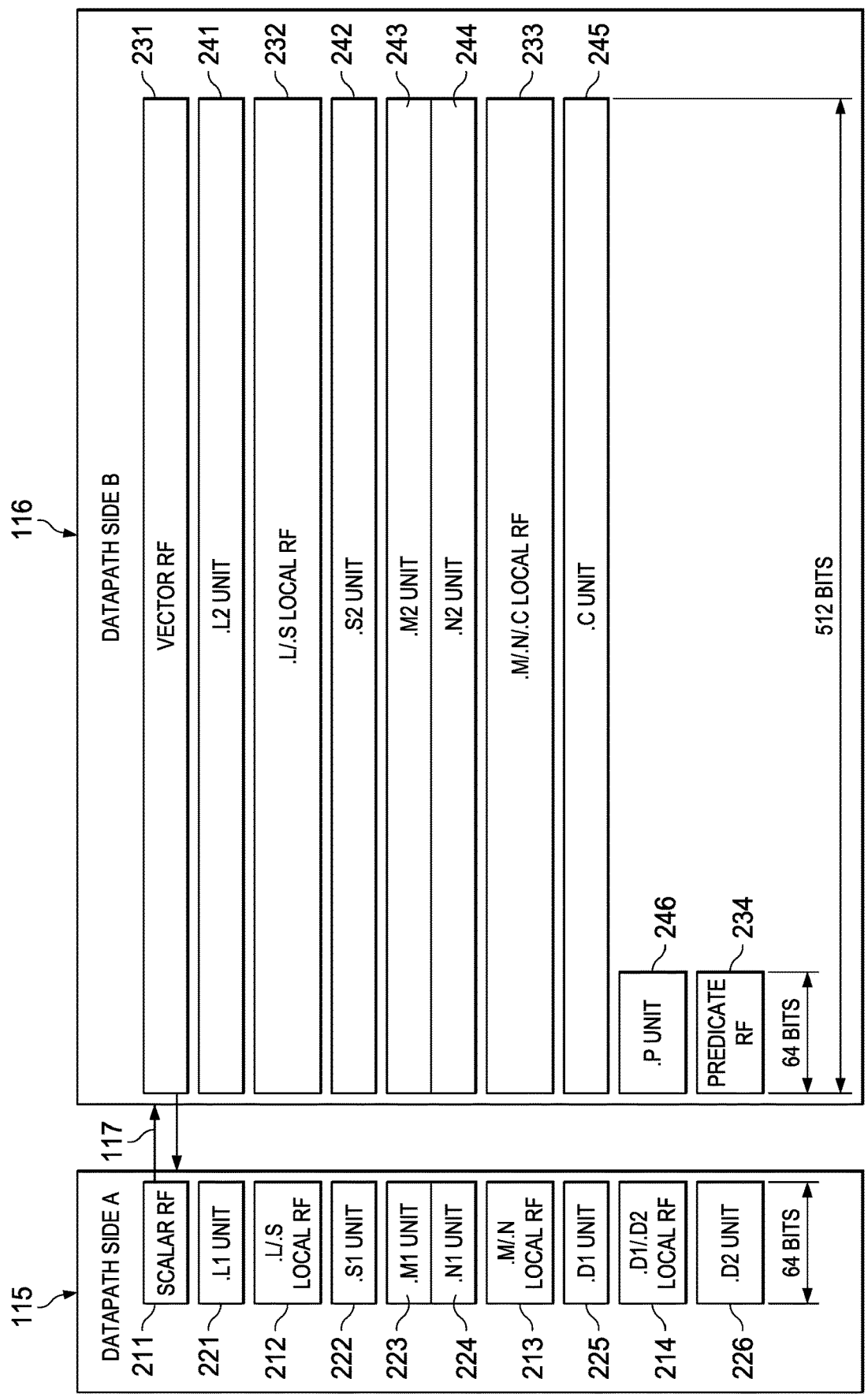
FIG. 2 illustrates the registers and functional units in the dual scalar/vector datapath processor illustrated in FIG. 1.

FIG. 2 illustrates further details of functional units and register files within scalar datapath side A 115 and vector datapath side B 116. Scalar datapath side A 115 includes global scalar register file 211, L1/S1 local register file 212, M1/N1 local register file 213 and D1/D2 local register file 214. Scalar datapath side A 115 includes L1 unit 221, S1 unit 222, M1 unit 223, N1 unit 224, D1 unit 225 and D2 unit 226. Vector datapath side B 116 includes global vector register file 231, L2/S2 local register file 232, M2/N2/C local register file 233 and predicate register file 234. Vector datapath side B 116 includes L2 unit 241, S2 unit 242, M2 unit 243, N2 unit 244, C unit 245, and P unit 246. There are limitations upon which functional units may read from or write to which register files. These will be detailed below.

Scalar datapath side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 preferably performs the following instruction selected operations: 64-bit add/subtract operations; 32-bit min/max operations; 8-bit Single Instruction Multiple Data (SIMD) instructions such as sum of absolute value, minimum and maximum determinations; circular min/max operations; and various move operations between register files. The result may be written into an instruction specified register of global scalar register file 211, L1/S1 local register file 212, M1/N1 local register file 213, or D1/D2 local register file 214.

Scalar datapath side A 115 includes S1 unit 222. S1 unit 222 generally accepts two 64-bit operands and produces one 64-bit result. The two operands are each recalled from an instruction specified register in either global scalar register file 211 or L1/S1 local register file 212. S1 unit 222 preferably performs the same type operations as L1 unit 221. There optionally may be slight variations between the data processing operations supported by L1 unit 221 and S1 unit 222. The result may be written into an instruction specified register of global scalar register file 211, L1/S1 local register file 212, M1/N1 local register file 213, or D1/D2 local register file 214.

Scalar datapath side A 115 includes M1 unit 223. M1 unit 223 generally accepts two 64-bit operands and produces one 64-bit result. The two operands are each recalled from an instruction specified register in either global scalar register file 211, or M1/N1 local register file 213. M1 unit 223 preferably performs the following instruction selected operations: 8-bit multiply operations; complex dot product operations; 32-bit bit count operations; complex conjugate multiply operations; and bit-wise Logical Operations, moves, adds and subtracts. The result may be written into an instruction specified register of global scalar register file 211, L1/S1 local register file 212, M1/N1 local register file 213, or D1/D2 local register file 214.

Scalar datapath side A 115 includes N1 unit 224. N1 unit 224 generally accepts two 64-bit operands and produces one 64-bit result. The two operands are each recalled from an instruction specified register in either global scalar register file 211 or M1/N1 local register file 213. N1 unit 224 preferably performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213, or D1/D2 local register file 214.

Scalar datapath side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. D1 unit 225 and D2 unit 226 preferably also perform: swapping, pack and unpack on the load and store data; 64-bit SIMD arithmetic operations; and 64-bit bit-wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213, or D1/D2 local register file 214.

Vector datapath side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. L2 unit 241 preferably performs instruction similar to L1 unit 221 except on wider 512-bit data. The result may be written into an instruction specified register of global vector register file 231, L2/S2 local register file 232, M2/N2/C local register file 233 or predicate register file 234.

Vector datapath side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. S2 unit 242 preferably performs instructions similar to S1 unit 222 except on wider 512-bit data. The result may be written into an instruction specified register of global vector register file 231, L2/S2 local register file 232, M2/N2/C local register file 233, or predicate register file 234. There may be certain double operations (called dual issued instructions) that employ both L2 unit 241 and the S2 unit 242 together. The result may be written into an instruction specified register of global vector register file 231, L2/S2 local register file 232, or M2/N2/C local register file 233.

Vector datapath side B 116 includes M2 unit 243. M2 unit 243 generally accepts two 512-bit operands and produces one 512-bit result. The two operands are each recalled from an instruction specified register in either global vector register file 231 or M2/N2/C local register file 233. M2 unit 243 preferably performs instructions similar to M1 unit 223 except on wider 512-bit data. The result may be written into an instruction specified register of global vector register file 231, L2/S2 local register file 232, or M2/N2/C local register file 233.

Vector datapath side B 116 includes N2 unit 244. N2 unit 244 generally accepts two 512-bit operands and produces one 512-bit result. The two operands are each recalled from an instruction specified register in either global vector register file 231 or M2/N2/C local register file 233. N2 unit 244 preferably performs the same type operations as M2 unit 243. There may be certain double operations (called dual issued instructions) that employ both M2 unit 243 and the N2 unit 244 together. The result may be written into an instruction specified register of global vector register file 231, L2/S2 local register file 232, or M2/N2/C local register file 233.

Vector datapath side B 116 includes C unit 245. C unit 245 generally accepts two 512-bit operands and produces one 512-bit result. The two operands are each recalled from an instruction specified register in either global vector register file 231 or M2/N2/C local register file 233. C unit 245 preferably performs: "Rake" and "Search" instructions; up to 512 2-bit PN*8-bit multiplies I/Q complex multiplies per clock cycle; 8-bit and 16-bit Sum-of-Absolute-Difference (SAD) calculations, up to 512 SADs per clock cycle; horizontal add and horizontal min/max instructions; and vector permutes instructions. C unit 245 includes also contains 4 vector control registers (CUCR0 to CUCR3) used to control certain operations of C unit 245 instructions. Control registers CUCR0 to CUCR3 are used as operands in certain C unit 245 operations. Control registers CUCR0 to CUCR3 are preferably used: in control of a general permutation instruction (VPERM); and as masks for SIMD multiple DOT product operations (DOTPM) and SIMD multiple Sum-of-Absolute-Difference (SAD) operations. Control register CUCR0 is preferably used to store the polynomials for Galois Field Multiply operations (GFMPY). Control register CUCR1 is preferably used to store the Galois field polynomial generator function.

Vector datapath side B 116 includes P unit 246. P unit 246 performs basic logic operations on registers of local predicate register file 234. P unit 246 has direct access to read from and write to predication register file 234. These operations include AND, ANDN, OR, XOR, NOR, BITR, NEG, SET, BITCNT, RMBD, BIT Decimate and Expand. A commonly expected use of P unit 246 includes manipulation of the SIMD vector comparison results for use in control of a further SIMD vector operation.

Figure 3:
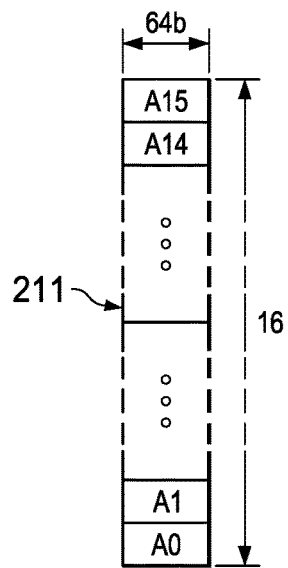
FIG. 3 illustrates a global scalar register file.

FIG. 3 illustrates global scalar register file 211. There are 16 independent 64-bit wide scalar registers designated A0 to A15. Each register of global scalar register file 211 can be read from or written to as 64-bits of scalar data. All scalar datapath side A 115 functional units (L1 unit 221, S1 unit 222, M1 unit 223, N1 unit 224, D1 unit 225 and D2 unit 226) can read or write to global scalar register file 211. Global scalar register file 211 may be read as 32-bits or as 64-bits and may only be written to as 64-bits. The instruction executing determines the read data size. Vector datapath side B 116 functional units (L2 unit 241, S2 unit 242, M2 unit 243, N2 unit 244, C unit 245, and P unit 246) can read from global scalar register file 211 via crosspath 117 under restrictions that will be detailed below.

Figure 4:
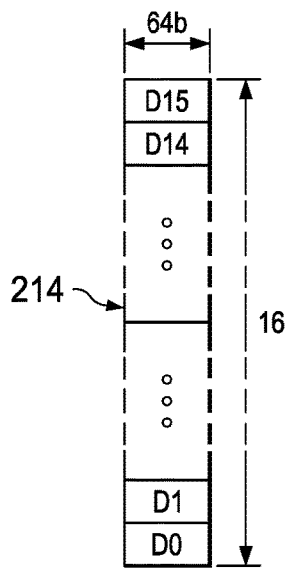
FIG. 4 illustrates a local scalar register file shared by arithmetic functional units.

FIG. 4 illustrates D1/D2 local register file 214. There are 16 independent 64-bit wide scalar registers designated D0 to D16. Each register of D1/D2 local register file 214 can be read from or written to as 64-bits of scalar data. All scalar datapath side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D1 local scalar register file 214. It is expected that data stored in D1/D2 local scalar register file 214 will include base addresses and offset addresses used in address calculation.

Figure 5:
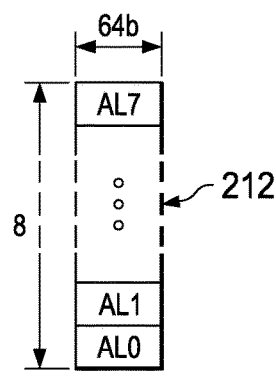
FIG. 5 illustrates a local scalar register file shared by multiply functional units.

FIG. 5 illustrates L1/S1 local register file 212. The embodiment illustrated in FIG. 5 has 8 independent 64-bit wide scalar registers designated AL0 to AL7. The preferred instruction coding (see FIG. 13) permits L1/S1 local register file 212 to include up to 16 registers. The embodiment of FIG. 5 implements only 8 registers to reduce circuit size and complexity. Each register of L1/S1 local register file 212 can be read from or written to as 64-bits of scalar data. All scalar datapath side A 115 functional units (L1 unit 221, S1 unit 222, M1 unit 223, N1 unit 224, D1 unit 225, and D2 unit 226) can write to L1/S1 local scalar register file 212. Only L1 unit 221 and S1 unit 222 can read from L1/S1 local scalar register file 212.

Figure 6:
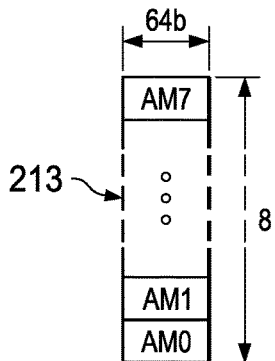
FIG. 6 illustrates local scalar register file of shared by load/store units.

FIG. 6 illustrates M1/N1 local register file 213. The embodiment illustrated in FIG. 6 has 8 independent 64-bit wide scalar registers designated AM0 to AM7. The preferred instruction coding (see FIG. 13) permits M1/N1 local register file 213 to include up to 16 registers. The embodiment of FIG. 6 implements only 8 registers to reduce circuit size and complexity. Each register of M1/N1 local register file 213 can be read from or written to as 64-bits of scalar data. All scalar datapath side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
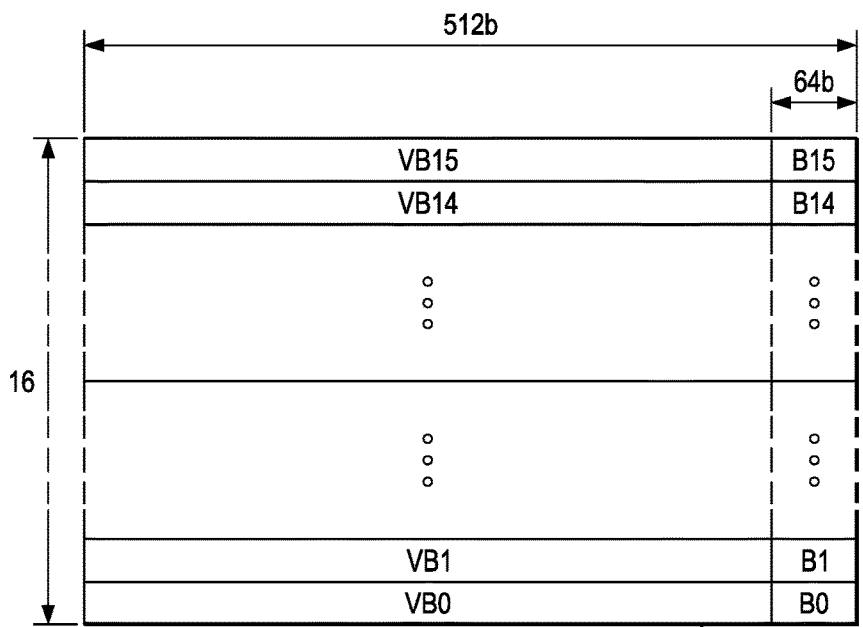
FIG. 7 illustrates a global vector register file.

FIG. 7 illustrates global vector register file 231. There are 16 independent 512-bit wide scalar registers. Each register of global vector register file 231 can be read from or written to as 64-bits of scalar data designated B0 to B15. Each register of global vector register file 231 can be read from or written to as 512-bits of vector data designated VB0 to VB15. The instruction type determines the data size. All vector datapath side B 116 functional units (L2 unit 241, S2 unit 242, M2 unit 243, N2 unit 244, C unit 245, and P unit 246) can read or write to global vector register file 231. Scalar datapath side A 115 functional units (L1 unit 221, S1 unit 222, M1 unit 223, N1 unit 224, D1 unit 225, and D2 unit 226) can read from global vector register file 231 via crosspath 117 under restrictions that will be detailed below.

Figure 8:
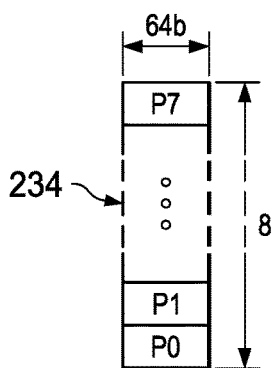
FIG. 8 illustrates a predicate register file.

FIG. 8 illustrates P local register file 234. There are 8 independent 64-bit wide registers designated P0 to P15. Each register of P local register file 234 can be read from or written to as 64-bits of scalar data. Vector datapath side B 116 functional units L2 unit 241, S2 unit 242, C unit 244 and P unit 246 can write to P local register file 234. Only L2 unit 241, S2 unit 242 and P unit 246 can read from P local scalar register file 234. A commonly expected use of P local register file 234 includes: writing one bit SIMD vector comparison results from L2 unit 241, S2 unit 242, or C unit 244; manipulation of the SIMD vector comparison results by P unit 246; and use of the manipulated results in control of a further SIMD vector operation.

Figure 9:
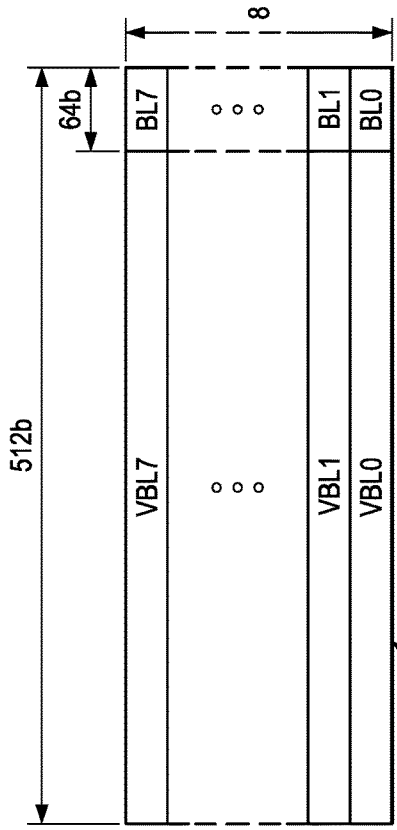
FIG. 9 illustrates a local vector register file shared by arithmetic functional units.

FIG. 9 illustrates L2/S2 local register file 232. The embodiment illustrated in FIG. 9 has 8 independent 512-bit wide scalar registers. The preferred instruction coding (see FIG. 13) permits L2/S2 local register file 232 to include up to 16 registers. The embodiment of FIG. 9 implements only 8 registers to reduce circuit size and complexity. Each register of L2/S2 local vector register file 232 can be read from or written to as 64-bits of scalar data designated BL0 to BL7. Each register of L2/S2 local vector register file 232 can be read from or written to as 512-bits of vector data designated VBL0 to VBL7. The instruction type determines the data size. All vector datapath side B 116 functional units (L2 unit 241, S2 unit 242, M2 unit 243, N2 unit 244, C unit 245 and P unit 246) can write to L2/S2 local vector register file 232. Only L2 unit 241 and S2 unit 242 can read from L2/S2 local vector register file 232.

Figure 10:
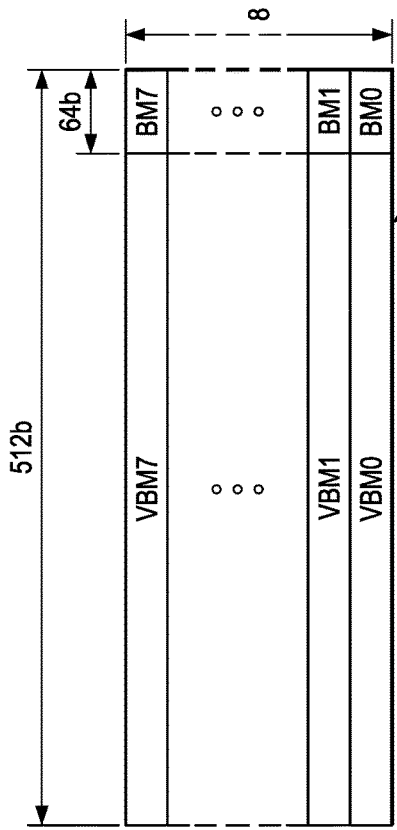
FIG. 10 illustrates a local vector register file shared by multiply and correlation functional units.

FIG. 10 illustrates M2/N2/C local register file 233. The embodiment illustrated in FIG. 10 has 8 independent 512-bit wide scalar registers. The preferred instruction coding (see FIG. 13) permits M2/N2/C local register file 233 to include up to 16 registers. The embodiment of FIG. 10 implements only 8 registers to reduce circuit size and complexity. Each register of M2/N2/C local vector register file 233 can be read from or written to as 64-bits of scalar data designated BM0 to BM7. Each register of M2/N2/C local vector register file 233 can be read from or written to as 512-bits of vector data designated VBM0 to VBM7. All vector datapath side B 116 functional units (L2 unit 241, S2 unit 242, M2 unit 243, N2 unit 244, C unit 245 and P unit 246) can write to M2/N2/C local vector register file 233. Only M2 unit 243, N2 unit 244 and C unit 245 can read from M2/N2/C local vector register file 233.

The provision of global register files accessible by all functional units of a side and local register files accessible by only some of the functional units of a side is a design choice. This invention could be practiced employing only one type of register file corresponding to the disclosed global register files.

Crosspath 117 permits limited exchange of data between scalar datapath side A 115 and vector datapath side B 116. During each operational cycle one 64-bit data word can be recalled from global scalar register file A 211 for use as an operand by one or more functional units of vector datapath side B 116 and one 64-bit data word can be recalled from global vector register file 231 for use as an operand by one or more functional units of scalar datapath side A 115. Any scalar datapath side A 115 functional unit (L1 unit 221, S1 unit 222, M1 unit 223, N1 unit 224, D1 unit 225 and D2 unit 226) may read a 64-bit operand from global vector register file 231. This 64-bit operand is the least significant bits of the 512-bit data in the accessed register of global vector register file 231. Plural scalar datapath side A 115 functional units may employ the same 64-bit crosspath data as an operand during the same operational cycle. However, only one 64-bit operand is transferred from vector datapath side B 116 to scalar datapath side A 115 in any single operational cycle. Any vector datapath side B 116 functional unit (L2 unit 241, S2 unit 242, M2 unit 243, N2 unit 244, C unit 245 and P unit 246) may read a 64-bit operand from global scalar register file 211. If the corresponding instruction is a scalar instruction, the crosspath operand data is treated as any other 64-bit operand. If the corresponding instruction is a vector instruction, the upper 448 bits of the operand are zero filled. Plural vector datapath side B 116 functional units may employ the same 64-bit crosspath data as an operand during the same operational cycle. Only one 64-bit operand is transferred from scalar datapath side A 115 to vector datapath side B 116 in any single operational cycle.

Streaming engine 125 transfers data in certain restricted circumstances. Streaming engine 125 controls two data streams. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened streaming engine 125: calculates the address; fetches the defined data type from level two unified cache (which may require cache service from a higher level memory); performs data type manipulation such as zero extension, sign extension, data element sorting/swapping such as matrix transposition; and delivers the data directly to the programmed data register file within central processing unit core 110. Streaming engine 125 is thus useful for real-time digital filtering operations on well-behaved data.

Streaming engine 125 frees these memory fetch tasks from the corresponding central processing unit core 110 enabling other processing functions.

Streaming engine 125 provides the following benefits. Streaming engine 125 permits multi-dimensional memory accesses. Streaming engine 125 increases the available bandwidth to the functional units. Streaming engine 125 minimizes the number of cache miss stalls since the stream buffer bypasses level one data cache 123. Streaming engine 125 reduces the number of scalar operations required to maintain a loop. Streaming engine 125 manages address pointers. Streaming engine 125 handles address generation automatically freeing up the address generation instruction slots and D1 unit 225 and D2 unit 226 for other computations.

Central processing unit core 110 operates on an instruction pipeline. Instructions are fetched in instruction packets of fixed length further described below. All instructions require the same number of pipeline phases for fetch and decode, but require a varying number of execute phases.

Figure 11:
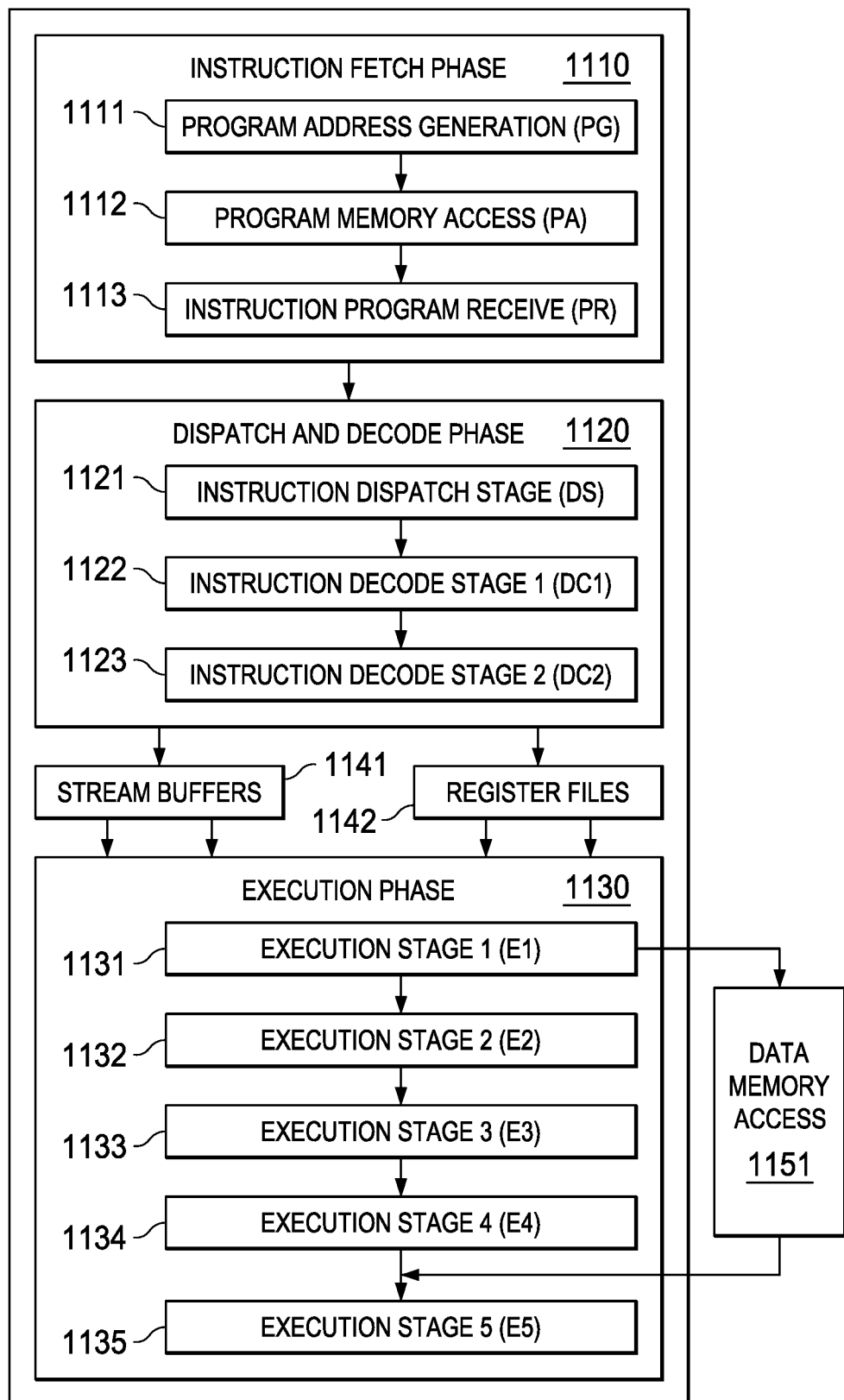
FIG. 11 illustrates pipeline phases of a central processing unit according to a preferred embodiment of this invention.

FIG. 11 illustrates the following pipeline phases: program fetch phase 1110, dispatch and decode phases 1120, and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in central processing unit core 110 and the read request is sent to the memory controller for the level one instruction cache L1I. During the program access stage 1112 (PA) the level one instruction cache L1I processes the request, accesses the data in its memory and sends a fetch packet to the central processing unit core 110 boundary. During the program receive stage 1113 (PR) central processing unit core 110 registers the fetch packet.

Figure 12:
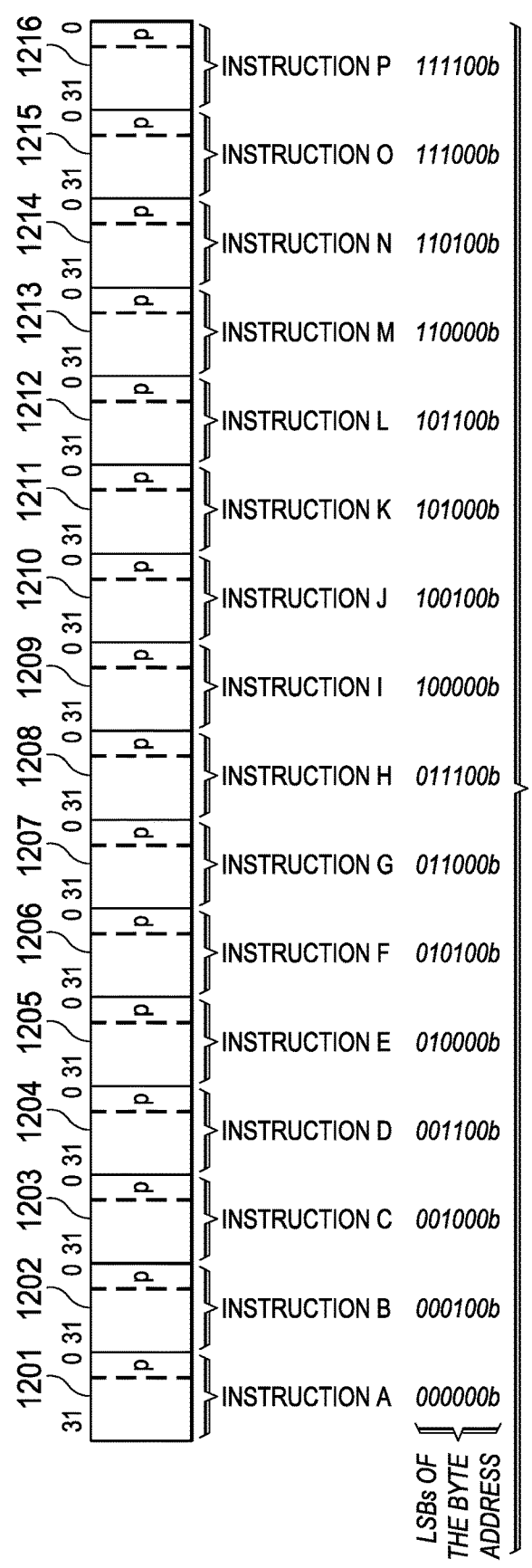
FIG. 12 illustrates sixteen instructions of a single fetch packet.

Instructions are always fetched sixteen 32-bit wide slots, constituting a fetch packet, at a time. FIG. 12 illustrates 16 instructions 1201 to 1216 of a single fetch packet. Fetch packets are aligned on 512-bit (16-word) boundaries. The preferred embodiment employs a fixed 32-bit instruction length. Fixed length instructions are advantageous for several reasons. Fixed length instructions enable easy decoder alignment. A properly aligned instruction fetch can load plural instructions into parallel instruction decoders. Such a properly aligned instruction fetch can be achieved by pre-determined instruction alignment when stored in memory (fetch packets aligned on 512-bit boundaries) coupled with a fixed instruction packet fetch. An aligned instruction fetch permits operation of parallel decoders on instruction-sized fetched bits. Variable length instructions require an initial step of locating each instruction boundary before they can be decoded. A fixed length instruction set generally permits more regular layout of instruction fields. This simplifies the construction of each decoder which is an advantage for a wide issue VLIW central processor.

The execution of the individual instructions is partially controlled by a p bit in each instruction. This p bit is preferably bit 0 of the 32-bit wide slot. The p bit determines whether an instruction executes in parallel with a next instruction. Instructions are scanned from lower to higher address. If the p bit of an instruction is 1, then the next following instruction (higher memory address) is executed in parallel with (in the same cycle as) that instruction. If the p bit of an instruction is 0, then the next following instruction is executed in the cycle after the instruction.

Central processing unit core 110 and level one instruction cache L1I 121 pipelines are de-coupled from each other. Fetch packet returns from level one instruction cache L1I can take different number of clock cycles, depending on external circumstances such as whether there is a hit in level one instruction cache 121 or a hit in level two combined cache 130. Therefore program access stage 1112 (PA) can take several clock cycles instead of 1 clock cycle as in the other stages.

The instructions executing in parallel constitute an execute packet. In the preferred embodiment an execute packet can contain up to sixteen instructions. No two instructions in an execute packet may use the same functional unit. A slot is one of five types: 1) a self-contained instruction executed on one of the functional units of central processing unit core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instruction; 3) a branch instruction; 4) a constant field extension; and 5) a conditional code extension. Some of these slot types will be further explained below.

Dispatch and decode phases 1110 include instruction dispatch to appropriate execution unit stage 1121 (DS), instruction pre-decode stage 1122 (DC1), and instruction decode, operand reads stage 1123 (DC2). During instruction dispatch to appropriate execution unit stage 1121 (DS), the fetch packets are split into execute packets and assigned to the appropriate functional units. During the instruction pre-decode stage 1122 (DC1), the source registers, destination registers and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at central processing unit core 110 cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the central processing unit core 110 boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

FIG. 13 illustrates an example of the instruction coding 1300 of functional unit instructions used by this invention. Those skilled in the art would realize that other instruction codings are feasible and within the scope of this invention. Each instruction consists of 32 bits and controls the operation of one of the individually controllable functional units (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246). The bit fields are defined as follows.

The creg field 1301 (bits 29 to 31) and the z bit 1302 (bit 28) are optional fields used in conditional instructions. These bits are used for conditional instructions to identify the predicate register and the condition. The z bit 1302 (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field 1301 and the z field 1302 are encoded in the instruction as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Execution of a conditional instruction is conditional upon the value stored in the specified data register. This data register is in the global scalar register file 211 for all functional units. Note that "z" in the z bit column refers to the zero/not zero comparison selection noted above and "x" is a don't care state. This coding can only specify a subset of the 16 global registers as predicate registers. This selection was made to preserve bits in the instruction coding. Note that unconditional instructions do not have these optional bits. For unconditional instructions these bits in fields 1301 and 1302 (28 to 31) are preferably used as additional opcode bits.

The dst field 1303 (bits 23 to 27) specifies a register in a corresponding register file as the destination of the instruction results.

The src2/cst field 1304 (bits 18 to 22) has several meanings depending on the instruction opcode field (bits 3 to 12 for all instructions and additionally bits 28 to 31 for unconditional instructions). The first meaning specifies a register of a corresponding register file as the second operand. The second meaning is an immediate constant. Depending on the instruction type, this is treated as an unsigned integer and zero extended to a specified data length or is treated as a signed integer and sign extended to the specified data length.

The src1 field 1305 (bits 13 to 17) specifies a register in a corresponding register file as the first source operand.

The opcode field 1306 (bits 3 to 12) for all instructions (and additionally bits 28 to 31 for unconditional instructions) specifies the type of instruction and designates appropriate instruction options. This includes unambiguous designation of the functional unit used and operation performed. A detailed explanation of the opcode is beyond the scope of this invention except for the instruction options detailed below.

The e bit 1307 (bit 2) is only used for immediate constant instructions where the constant may be extended. If e=1, then the immediate constant is extended in a manner detailed below. If e=0, then the immediate constant is not extended. In that case the immediate constant is specified by the src2/cst field 1304 (bits 18 to 22). Note that this e bit 1307 is used for only some instructions. Accordingly, with proper coding this e bit 1307 may be omitted from instructions which do not need it and this bit used as an additional opcode bit.

The s bit 1308 (bit 1) designates scalar datapath side A 115 or vector datapath side B 116. If s=0, then scalar datapath side A 115 is selected. This limits the functional unit to L1 unit 221, S1 unit 222, M1 unit 223, N1 unit 224, D1 unit 225 and D2 unit 226 and the corresponding register files illustrated in FIG. 2. Similarly, s=1 selects vector datapath side B 116 limiting the functional unit to L2 unit 241, S2 unit 242, M2 unit 243, N2 unit 244, P unit 246 and the corresponding register file illustrated in FIG. 2.

The p bit 1309 (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to twelve instructions. Each instruction in an execute packet must use a different functional unit.

There are two different condition code extension slots. Each execute packet can contain one each of these unique 32-bit condition code extension slots which contains the 4-bit creg/z fields for the instructions in the same execute packet. FIG. 14 illustrates the coding for condition code extension slot 0 and FIG. 15 illustrates the coding for condition code extension slot 1.

FIG. 14 illustrates the coding for condition code extension slot 0 having 32 bits. Field 1401 (bits 28 to 31) specify 4 creg/z bits assigned to the L1 unit 221 instruction in the same execute packet. Field 1402 (bits 27 to 24) specify 4 creg/z bits assigned to the L2 unit 241 instruction in the same execute packet. Field 1403 (bits 19 to 23) specify 4 creg/z bits assigned to the S1 unit 222 instruction in the same execute packet. Field 1404 (bits 16 to 19) specify 4 creg/z bits assigned to the S2 unit 242 instruction in the same execute packet. Field 1405 (bits 12 to 15) specify 4 creg/z bits assigned to the D1 unit 225 instruction in the same execute packet. Field 1406 (bits 8 to 11) specify 4 creg/z bits assigned to the D2 unit 226 instruction in the same execute packet. Field 1407 (bits 6 and 7) is unused/reserved. Field 1408 (bits 0 to 5) are coded a set of unique bits (CCEX0) to identify the condition code extension slot 0. Once this unique ID of condition code extension slot 0 is detected, the corresponding creg/z bits are employed to control conditional execution of any L1 unit 221, L2 unit 241, S1 unit 222, S2 unit 242, D1 unit 225 and D2 unit 226 instruction in the same execution packet. These creg/z bits are interpreted as shown in Table 1. If the corresponding instruction is conditional (includes creg/z bits) the corresponding bits in the condition code extension slot 0 override the condition code bits in the instruction. Note that no execution packet can have more than one instruction directed to a particular execution unit. No execute packet of instructions can contain more than one condition code extension slot 0. Thus the mapping of creg/z bits to functional unit instruction is unambiguous. Setting the creg/z bits equal to "0000" makes the instruction unconditional. Thus a properly coded condition code extension slot 0 can make some corresponding instructions conditional and some unconditional.

FIG. 15 illustrates the coding for condition code extension slot 1 having 32 bits. Field 1501 (bits 28 to 31) specify 4 creg/z bits assigned to the M1 unit 223 instruction in the same execute packet. Field 1502 (bits 27 to 24) specify 4 creg/z bits assigned to the M2 unit 243 instruction in the same execute packet. Field 1503 (bits 19 to 23) specify 4 creg/z bits assigned to the C unit 245 instruction in the same execute packet. Field 1504 (bits 16 to 19) specify 4 creg/z bits assigned to the N1 unit 224 instruction in the same execute packet. Field 1505 (bits 12 to 15) specify 4 creg/z bits assigned to the N2 unit 244 instruction in the same execute packet. Field 1506 (bits 6 to 11) is unused/reserved. Field 1507 (bits 0 to 5) are coded a set of unique bits (CCEX1) to identify the condition code extension slot 1. Once this unique ID of condition code extension slot 1 is detected, the corresponding creg/z bits are employed to control conditional execution of any M1 unit 223, M2 unit 243, C unit 245, N1 unit 224 and N2 unit 244 instruction in the same execution packet. These creg/z bits are interpreted as shown in Table 1. If the corresponding instruction is conditional (includes creg/z bits) the corresponding bits in the condition code extension slot 1 override the condition code bits in the instruction. Note that no execution packet can have more than one instruction directed to a particular execution unit. No execute packet of instructions can contain more than one condition code extension slot 1. Thus the mapping of creg/z bits to functional unit instruction is unambiguous. Setting the creg/z bits equal to "0000" makes the instruction unconditional. Thus a properly coded condition code extension slot 1 can make some instructions conditional and some unconditional.

It is feasible for both condition code extension slot 0 and condition code extension slot 1 to include a p bit to define an execute packet as described above in conjunction with FIG. 13. In the preferred embodiment, as illustrated in FIGS. 14 and 15, code extension slot 0 and condition code extension slot 1 preferably have bit 0 (p bit) always encoded as 1. Thus neither condition code extension slot 0 nor condition code extension slot 1 can be in the last instruction slot of an execute packet.

There are two different constant extension slots. Each execute packet can contain one each of these unique 32-bit constant extension slots which contains 27 bits to be concatenated as high order bits with the 5-bit constant field 1305 to form a 32-bit constant. As noted in the instruction coding description above only some instructions define the src2/cst field 1304 as a constant rather than a source register identifier. At least some of those instructions may employ a constant extension slot to extend this constant to 32 bits.

FIG. 16 illustrates the fields of constant extension slot 0. Each execute packet may include one instance of constant extension slot 0 and one instance of constant extension slot 1. FIG. 16 illustrates that constant extension slot 0 1600 includes two fields. Field 1601 (bits 5 to 31) constitute the most significant 27 bits of an extended 32-bit constant including the target instruction scr2/cst field 1304 as the five least significant bits. Field 1602 (bits 0 to 4) are coded a set of unique bits (CSTX0) to identify the constant extension slot 0. In the preferred embodiment constant extension slot 0 1600 can only be used to extend the constant of one of an L1 unit 221 instruction, data in a D1 unit 225 instruction, an S2 unit 242 instruction, an offset in a D2 unit 226 instruction, an M2 unit 243 instruction, an N2 unit 244 instruction, a branch instruction, or a C unit 245 instruction in the same execute packet. Constant extension slot 1 is similar to constant extension slot 0 except that bits 0 to 4 are coded a set of unique bits (CSTX1) to identify the constant extension slot 1. In the preferred embodiment constant extension slot 1 can only be used to extend the constant of one of an L2 unit 241 instruction, data in a D2 unit 226 instruction, an S1 unit 222 instruction, an offset in a D1 unit 225 instruction, an M1 unit 223 instruction or an N1 unit 224 instruction in the same execute packet.

Constant extension slot 0 and constant extension slot 1 are used as follows. The target instruction must be of the type permitting constant specification. As known in the art this is implemented by replacing one input operand register specification field with the least significant bits of the constant as described above with respect to scr2/cst field 1304. Instruction decoder 113 determines this case, known as an immediate field, from the instruction opcode bits. The target instruction also includes one constant extension bit (e bit 1307) dedicated to signaling whether the specified constant is not extended (preferably constant extension bit=0) or the constant is extended (preferably constant extension bit=1). If instruction decoder 113 detects a constant extension slot 0 or a constant extension slot 1, it further checks the other instructions within that execute packet for an instruction corresponding to the detected constant extension slot. A constant extension is made only if one corresponding instruction has a constant extension bit (e bit 1307) equal to 1.

Figure 17:
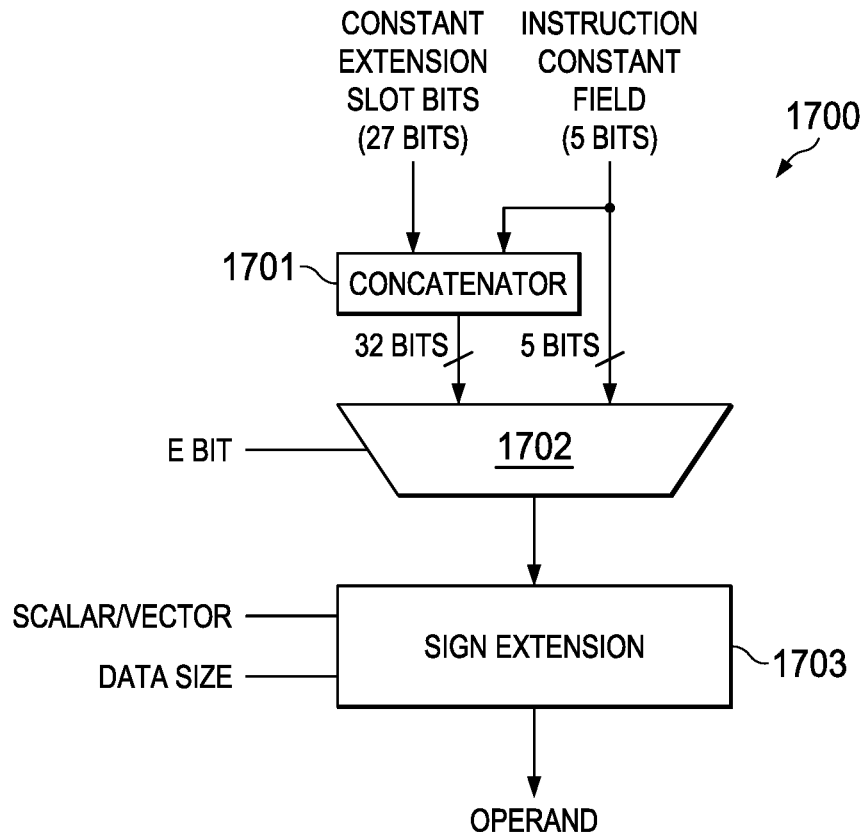
FIG. 17 is a partial block diagram illustrating constant extension.

FIG. 17 is a partial block diagram 1700 illustrating constant extension. FIG. 17 assumes that instruction decoder 113 detects a constant extension slot and a corresponding instruction in the same execute packet. Instruction decoder 113 supplies the 27 extension bits from the constant extension slot (bit field 1601) and the 5 constant bits (bit field 1305) from the corresponding instruction to concatenator 1701. Concatenator 1701 forms a single 32-bit word from these two parts. In the preferred embodiment the 27 extension bits from the constant extension slot (bit field 1601) are the most significant bits and the 5 constant bits (bit field 1305) are the least significant bits. This combined 32-bit word is supplied to one input of multiplexer 1702. The 5 constant bits from the corresponding instruction field 1305 supply a second input to multiplexer 1702. Selection of multiplexer 1702 is controlled by the status of the constant extension bit. If the constant extension bit (e bit 1307) is 1 (extended), multiplexer 1702 selects the concatenated 32-bit input. If the constant extension bit is 0 (not extended), multiplexer 1702 selects the 5 constant bits from the corresponding instruction field 1305. Multiplexer 1702 supplies this output to an input of sign extension unit 1703.

Sign extension unit 1703 forms the final operand value from the input from multiplexer 1703. Sign extension unit 1703 receives control inputs Scalar/Vector and Data Size. The Scalar/Vector input indicates whether the corresponding instruction is a scalar instruction or a vector instruction. The functional units of data path side A 115 (L1 unit 221, S1 unit 222, M1 unit 223, N1 unit 224, D1 unit 225 and D2 unit 226) can only perform scalar instructions. Any instruction directed to one of these functional units is a scalar instruction. Data path side B functional units L2 unit 241, S2 unit 242, M2 unit 243, N2 unit 244 and C unit 245 may perform scalar instructions or vector instructions. Instruction decoder 113 determines whether the instruction is a scalar instruction or a vector instruction from the opcode bits. P unit 246 may only perform scalar instructions. The Data Size may be 8 bits (byte B), 16 bits (half-word H), 32 bits (word W) or 64 bits (double word D).

Table 2 lists the operation of sign extension unit 1703 for the various options.

TABLE 2

| Instruction Type | Operand Size | Constant Length | Action |
| --- | --- | --- | --- |
| Scalar | B/H/W/D | 5 bits | Sign extend to 64 bits |
| Scalar | B/H/W/D | 32 bits | Sign extend to 64 bits |
| Vector | B/H/W/D | 5 bits | Sign extend to operand size and replicate across whole vector |
| Vector | B/H/W | 32 bits | Replicate 32-bit constant across each 32-bit (W) lane |
| Vector | D | 32 bits | Sign extend to 64 bits and replicate across each 64-bit (D) lane |

It is feasible for both constant extension slot 0 and constant extension slot 1 to include a p bit to define an execute packet as described above in conjunction with FIG. 13. In the preferred embodiment, as in the case of the condition code extension slots, constant extension slot 0 and constant extension slot 1 preferably have bit 0 (p bit) always encoded as 1. Thus neither constant extension slot 0 nor constant extension slot 1 can be in the last instruction slot of an execute packet.

It is technically feasible for an execute packet to include a constant extension slot 0 or 1 and more than one corresponding instruction marked constant extended (e bit=1). For constant extension slot 0 this would mean more than one of an L1 unit 221 instruction, data in a D1 unit 225 instruction, an S2 unit 242 instruction, an offset in a D2 unit 226 instruction, an M2 unit 243 instruction or an N2 unit 244 instruction in an execute packet have an e bit of 1. For constant extension slot 1 this would mean more than one of an L2 unit 241 instruction, data in a D2 unit 226 instruction, an S1 unit 222 instruction, an offset in a D1 unit 225 instruction, an M1 unit 223 instruction or an N1 unit 224 instruction in an execute packet have an e bit of 1. Supplying the same constant extension to more than one instruction is not expected to be a useful function. Accordingly, in one embodiment instruction decoder 113 may determine this case an invalid operation and not supported. Alternately, this combination may be supported with extension bits of the constant extension slot applied to each corresponding functional unit instruction marked constant extended.

Special vector predicate instructions use registers in predicate register file 234 to control vector operations. In the current embodiment all these SIMD vector predicate instructions operate on selected data sizes. The data sizes may include byte (8 bit) data, half word (16 bit) data, word (32 bit) data, double word (64 bit) data, quad word (128 bit) data and half vector (256 bit) data. Each bit of the predicate register controls whether a SIMD operation is performed upon the corresponding byte of data. The operations of P unit 245 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

L1 unit 221, S1 unit 222, L2 unit 241, S2 unit 242 and C unit 245 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 18:
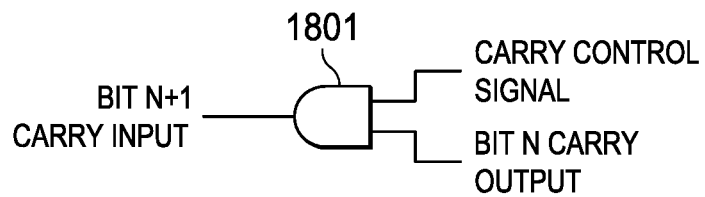
FIG. 18 illustrates the carry control for SIMD operations according to this invention.

FIG. 18 illustrates the carry control. AND gate 1801 receives the carry output of bit N within the operand wide arithmetic logic unit (64 bits for scalar datapath side A 115 functional units and 512 bits for vector datapath side B 116 functional units). AND gate 1801 also receives a carry control signal which will be further explained below. The output of AND gate 1801 is supplied to the carry input of bit N+1 of the operand wide arithmetic logic unit. AND gates such as AND gate 1801 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is the minimum, then each carry control signal is 0, effectively blocking carry transmission between the adjacent bits. The corresponding carry control signal is 1 if the selected data size requires both arithmetic logic unit sections. Table 3 below shows example carry control signals for the case of a 512 bit wide operand such as used by vector datapath side B 116 functional units which may be divided into sections of 8 bits, 16 bits, 32 bits, 64 bits, 128 bits or 256 bits. In Table the upper 32 bits control the upper bits (bits 128 to 511) carries and the lower 32 bits control the lower bits (bits 0 to 127) carries. No control of the carry output of the most significant bit is needed, thus only 63 carry control signals are required.

TABLE 3

| Data Size | Carry Control Signals | | | | | | | |
| --- | --- | --- | --- | --- | --- | --- | --- | --- |
| 8 bits (B) | –000 | 0000 | 0000 | 0000 | 0000 | 0000 | 0000 | 0000 |
|  | 0000 | 0000 | 0000 | 0000 | 0000 | 0000 | 0000 | 0000 |
| 16 bits (H) | –101 | 0101 | 0101 | 0101 | 0101 | 0101 | 0101 | 0101 |
|  | 0101 | 0101 | 0101 | 0101 | 0101 | 0101 | 0101 | 0101 |
| 32 bits (W) | –111 | 0111 | 0111 | 0111 | 0111 | 0111 | 0111 | 0111 |
|  | 0111 | 0111 | 0111 | 0111 | 0111 | 0111 | 0111 | 0111 |
| 64 bits (D) | –111 | 1111 | 0111 | 1111 | 0111 | 1111 | 0111 | 1111 |
|  | 0111 | 1111 | 0111 | 1111 | 0111 | 1111 | 0111 | 1111 |
| 128 bits | –111 | 1111 | 1111 | 1111 | 0111 | 1111 | 1111 | 1111 |
|  | 0111 | 1111 | 1111 | 1111 | 0111 | 1111 | 1111 | 1111 |
| 256 bits | –111 | 1111 | 1111 | 1111 | 1111 | 1111 | 1111 | 1111 |
|  | 0111 | 1111 | 1111 | 1111 | 1111 | 1111 | 1111 | 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

Figure 19:
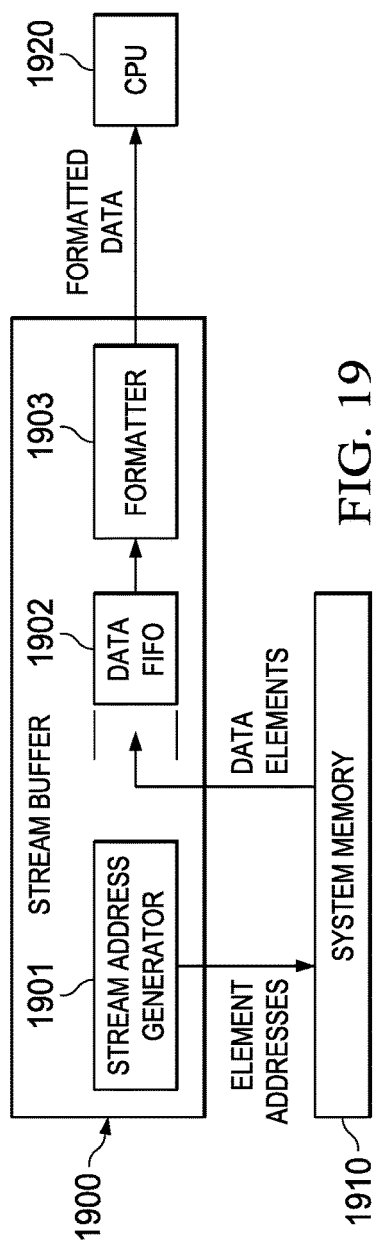
FIG. 19 illustrates a conceptual view of the streaming engines of this invention.

FIG. 19 illustrates a conceptual view of the streaming engines of this invention. FIG. 19 illustrates the process of a single stream. Streaming engine 1900 includes stream address generator 1901. Stream address generator 1901 sequentially generates addresses of the elements of the stream and supplies these element addresses to system memory 1910. Memory 1910 recalls data stored at the element addresses (data elements) and supplies these data elements to data first-in-first-out (FIFO) memory 1902. Data FIFO 1902 provides buffering between memory 1910 and CPU 1920. Data formatter 1903 receives the data elements from data FIFO memory 1902 and provides data formatting according to the stream definition. This process will be described below. Streaming engine 1900 supplies the formatted data elements from data formatter 1903 to the CPU 1920. The program on CPU 1920 consumes the data and generates an output.

Stream elements typically reside in normal memory. The memory itself imposes no particular structure upon the stream. Programs define streams and therefore impose structure, by specifying the following stream attributes: address of the first element of the stream; size and type of the elements in the stream; formatting for data in the stream; and the address sequence associated with the stream.

The streaming engine defines an address sequence for elements of the stream in terms of a pointer walking through memory. A multiple-level nested loop controls the path the pointer takes. An iteration count for a loop level indicates the number of times that level repeats. A dimension gives the distance between pointer positions of that loop level.

In a basic forward stream the innermost loop always consumes physically contiguous elements from memory. The implicit dimension of this innermost loop is 1 element. The pointer itself moves from element to element in consecutive, increasing order. In each level outside the inner loop, that loop moves the pointer to a new location based on the size of that loop level's dimension.

This form of addressing allows programs to specify regular paths through memory in a small number of parameters. Table 4 lists the addressing parameters of a basic stream.

TABLE 4

| Parameter | Definition |
| --- | --- |
| ELEM_BYTES | Size of each element in bytes |
| ICNT0 | Number of iterations for the innermost loop level 0. At loop level 0 all elements are physically contiguous DIM0 is ELEM_BYTES |
| ICNT1 | Number of iterations for loop level 1 |
| DIM1 | Number of bytes between the starting points for consecutive iterations of loop level 1 |
| ICNT2 | Number of iterations for loop level 2 |
| DIM2 | Number of bytes between the starting points for consecutive iterations of loop level 2 |
| ICNT3 | Number of iterations for loop level 3 |
| DIM3 | Number of bytes between the starting points for consecutive iterations of loop level 3 |
| ICNT4 | Number of iterations for loop level 4 |
| DIM4 | Number of bytes between the starting points for consecutive iterations of loop level 4 |
| ICNT5 | Number of iterations for loop level 5 |
| DIM5 | Number of bytes between the starting points for consecutive iterations of loop level 5 |

The definition above maps consecutive elements of the stream to increasing addresses in memory. This works well for most algorithms but not all. Some algorithms are better served by reading elements in decreasing memory addresses, reverse stream addressing. For example, a discrete convolution computes vector dot-products, as per the formula:

$$(f, g)[t] = \sum_{x=-\infty}^{\infty} f[x]g[t-x]$$

In most DSP code, f[ ] and g[ ] represent arrays in memory. For each output, the algorithm reads f[ ] in the forward direction, but reads g[ ] in the reverse direction. Practical filters limit the range of indices for [x] and [t-x] to a finite number elements. To support this pattern, the streaming engine supports reading elements in decreasing address order.

Matrix multiplication presents a unique problem to the streaming engine. Each element in the matrix product is a vector dot product between a row from the first matrix and a column from the second. Programs typically store matrices all in row-major or column-major order. Row-major order stores all the elements of a single row contiguously in memory. Column-major order stores all elements of a single column contiguously in memory. Matrices typically get stored in the same order as the default array order for the language. As a result, only one of the two matrices in a matrix multiplication map on to the streaming engine's 2-dimensional stream definition. In a typical example a first index steps through columns on array first array but rows on second array. This problem is not unique to the streaming engine. Matrix multiplication's access pattern fits poorly with most general-purpose memory hierarchies. Some software libraries transposed one of the two matrices, so that both get accessed row-wise (or column-wise) during multiplication. The streaming engine supports implicit matrix transposition with transposed streams. Transposed streams avoid the cost of explicitly transforming the data in memory. Instead of accessing data in strictly consecutive-element order, the streaming engine effectively interchanges the inner two loop dimensions in its traversal order, fetching elements along the second dimension into contiguous vector lanes.

This algorithm works, but is impractical to implement for small element sizes. Some algorithms work on matrix tiles which are multiple columns and rows together. Therefore, the streaming engine defines a separate transposition granularity. The hardware imposes a minimum granularity. The transpose granularity must also be at least as large as the element size. Transposition granularity causes the streaming engine to fetch one or more consecutive elements from dimension 0 before moving along dimension 1. When the granularity equals the element size, this results in fetching a single column from a row-major array. Otherwise, the granularity specifies fetching 2, 4 or more columns at a time from a row-major array. This is also applicable for column-major layout by exchanging row and column in the description. A parameter GRANULE indicates the transposition granularity in bytes.

Another common matrix multiplication technique exchanges the innermost two loops of the matrix multiply. The resulting inner loop no longer reads down the column of one matrix while reading across the row of another. For example the algorithm may hoist one term outside the inner loop, replacing it with the scalar value. On a vector machine, the innermost loop can be implements very efficiently with a single scalar-by-vector multiply followed by a vector add.

The central processing unit core 110 of this invention lacks a scalar-by-vector multiply. Programs must instead duplicate the scalar value across the length of the vector and use a vector-by-vector multiply. The streaming engine of this invention directly supports this and related use models with an element duplication mode. In this mode, the streaming engine reads a granule smaller than the full vector size and replicates that granule to fill the next vector output.

The streaming engine treats each complex number as a single element with two sub-elements that give the real and imaginary (rectangular) or magnitude and angle (polar) portions of the complex number. Not all programs or peripherals agree what order these sub-elements should appear in memory. Therefore, the streaming engine offers the ability to swap the two sub-elements of a complex number with no cost. This feature swaps the halves of an element without interpreting the contents of the element and can be used to swap pairs of sub-elements of any type, not just complex numbers.

Algorithms generally prefer to work at high precision, but high precision values require more storage and bandwidth than lower precision values. Commonly, programs will store data in memory at low precision, promote those values to a higher precision for calculation and then demote the values to lower precision for storage. The streaming engine supports this directly by allowing algorithms to specify one level of type promotion. In the preferred embodiment of this invention every sub-element may be promoted to the next larger type size with either sign or zero extension for integer types. It is also feasible that the streaming engine may support floating point promotion, promoting 16-bit and 32-bit floating point values to 32-bit and 64-bit formats, respectively.

The streaming engine defines a stream as a discrete sequence of data elements, the central processing unit core 110 consumes data elements packed contiguously in vectors. Vectors resemble streams in as much as they contain multiple homogeneous elements with some implicit sequence. Because the streaming engine reads streams, but the central processing unit core 110 consumes vectors, the streaming engine must map streams onto vectors in a consistent way.

Vectors consist of equal-sized lanes, each lane containing a sub-element. The central processing unit core 110 designates the rightmost lane of the vector as lane 0, regardless of device's current endian mode. Lane numbers increase right-to-left. The actual number of lanes within a vector varies depending on the length of the vector and the data size of the sub-element.

Figure 20:
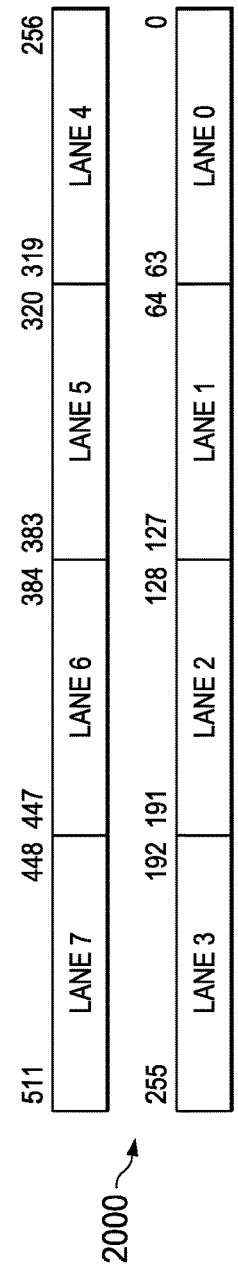
FIG. 20 illustrates a first example of lane allocation in a vector.

FIG. 20 illustrates a first example of lane allocation in a vector. Vector 2000 is divided into 8 64-bit lanes (8×64 bits=512 bits the vector length). Lane 0 includes bits 0 to 63; line 1 includes bits 64 to 127; lane 2 includes bits 128 to 191; lane 3 includes bits 192 to 255, lane 4 includes bits 256 to 319, lane 5 includes bits 320 to 383, lane 6 includes bits 384 to 447 and lane 7 includes bits 448 to 511.

Figure 21:
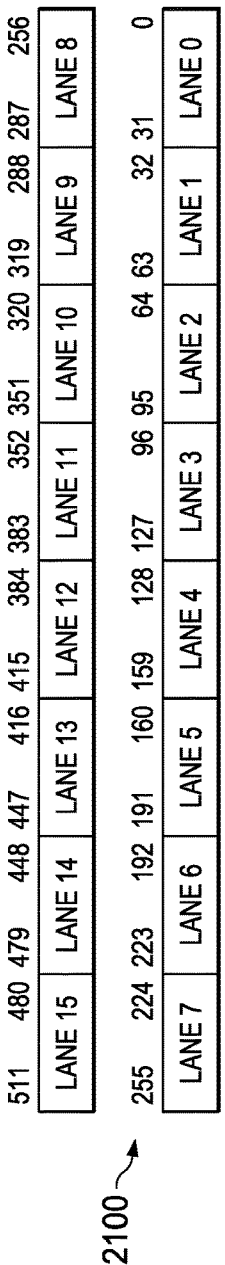
FIG. 21 illustrates a second example of lane allocation in a vector.

FIG. 21 illustrates a second example of lane allocation in a vector. Vector 2100 is divided into 16 32-bit lanes (16×32 bits=512 bits the vector length). Lane 0 includes bits 0 to 31; line 1 includes bits 32 to 63; lane 2 includes bits 64 to 95; lane 3 includes bits 96 to 127; lane 4 includes bits 128 to 159; lane 5 includes bits 160 to 191; lane 6 includes bits 192 to 223; lane 7 includes bits 224 to 255; lane includes bits 256 to 287; line 9 occupied bits 288 to 319; lane 10 includes bits 320 to 351; lane 11 includes bits 352 to 383; lane 12 includes bits 384 to 415; lane 13 includes bits 416 to 447; lane 14 includes bits 448 to 479; and lane 15 includes bits 480 to 511.

The streaming engine maps the innermost stream dimension directly to vector lanes. It maps earlier elements within that dimension to lower lane numbers and later elements to higher lane numbers. This is true regardless of whether this particular stream advances in increasing or decreasing address order. Whatever order the stream defines, the streaming engine deposits elements in vectors in increasing-lane order. For non-complex data, it places the first element in lane 0 of the first vector central processing unit core 110 fetches, the second in lane 1, and so on. For complex data, the streaming engine places the first element in lanes 0 and 1, second in lanes 2 and 3, and so on. Sub-elements within an element retain the same relative ordering regardless of the stream direction. For non-swapped complex elements, this places the sub-elements with the lower address of each pair in the even numbered lanes, and the sub-elements with the higher address of each pair in the odd numbered lanes. Swapped complex elements reverse this mapping.

The streaming engine fills each vector central processing unit core 110 fetches with as many elements as it can from the innermost stream dimension. If the innermost dimension is not a multiple of the vector length, the streaming engine pads that dimension out to a multiple of the vector length with zeros. Thus for higher-dimension streams, the first element from each iteration of an outer dimension arrives in lane 0 of a vector. The streaming engine always maps the innermost dimension to consecutive lanes in a vector. For transposed streams, the innermost dimension consists of groups of sub-elements along dimension 1, not dimension 0, as transposition exchanges these two dimensions.

Two dimensional streams exhibit great variety as compared to one dimensional streams. A basic two dimensional stream extracts a smaller rectangle from a larger rectangle. A transposed 2-D stream reads a rectangle column-wise instead of row-wise. A looping stream, where the second dimension overlaps first executes a finite impulse response (FIR) filter taps which loops repeatedly or FIR filter samples which provide a sliding window of input samples.

Figure 22:
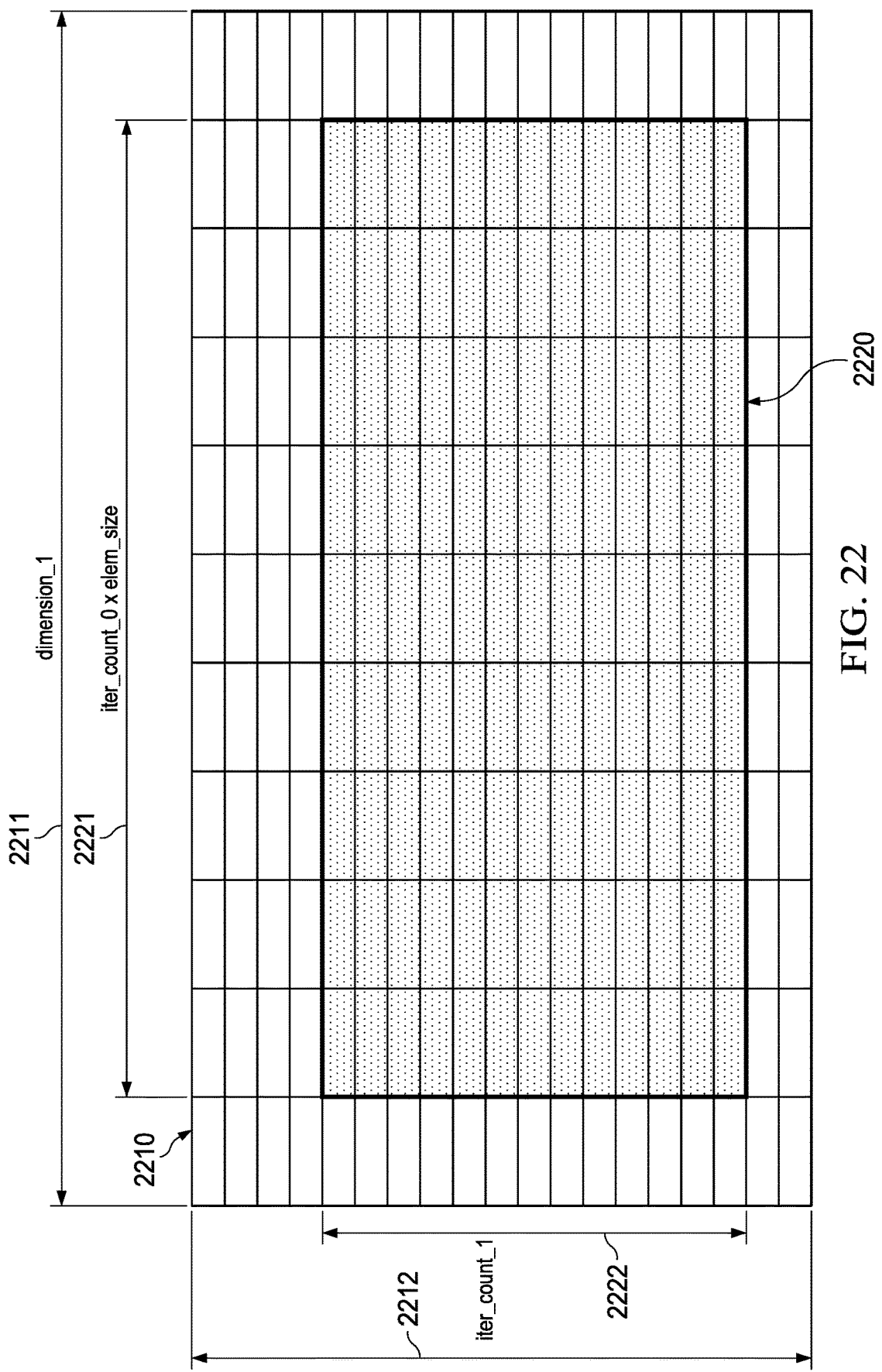
FIG. 22 illustrates a basic two dimensional stream.

FIG. 22 illustrates a basic two dimensional stream. The inner two dimensions, represented by ELEM_BYTES, ICNT0, DIM1 and ICNT1 give sufficient flexibility to describe extracting a smaller rectangle 2220 having dimensions 2221 and 2222 from a larger rectangle 2210 having dimensions 2211 and 2212. In this example rectangle 2220 is a 9 by 13 rectangle of 64-bit values and rectangle 2210 is a larger 11 by 19 rectangle. The following stream parameters define this stream:

ICNT0=9
ELEM_BYTES=8
ICNT1=13
DIM1=88 (11 times 8)

Thus the iteration count in the 0 dimension 2221 is 9. The iteration count in the 1 direction 2222 is 13. Note that the ELEM_BYTES only scales the innermost dimension. The first dimension has ICNT0 elements of size ELEM_BYTES. The stream address generator does not scale the outer dimensions. Therefore, DIM1=88, which is 11 elements scaled by 8 bytes per element.

Figure 23:
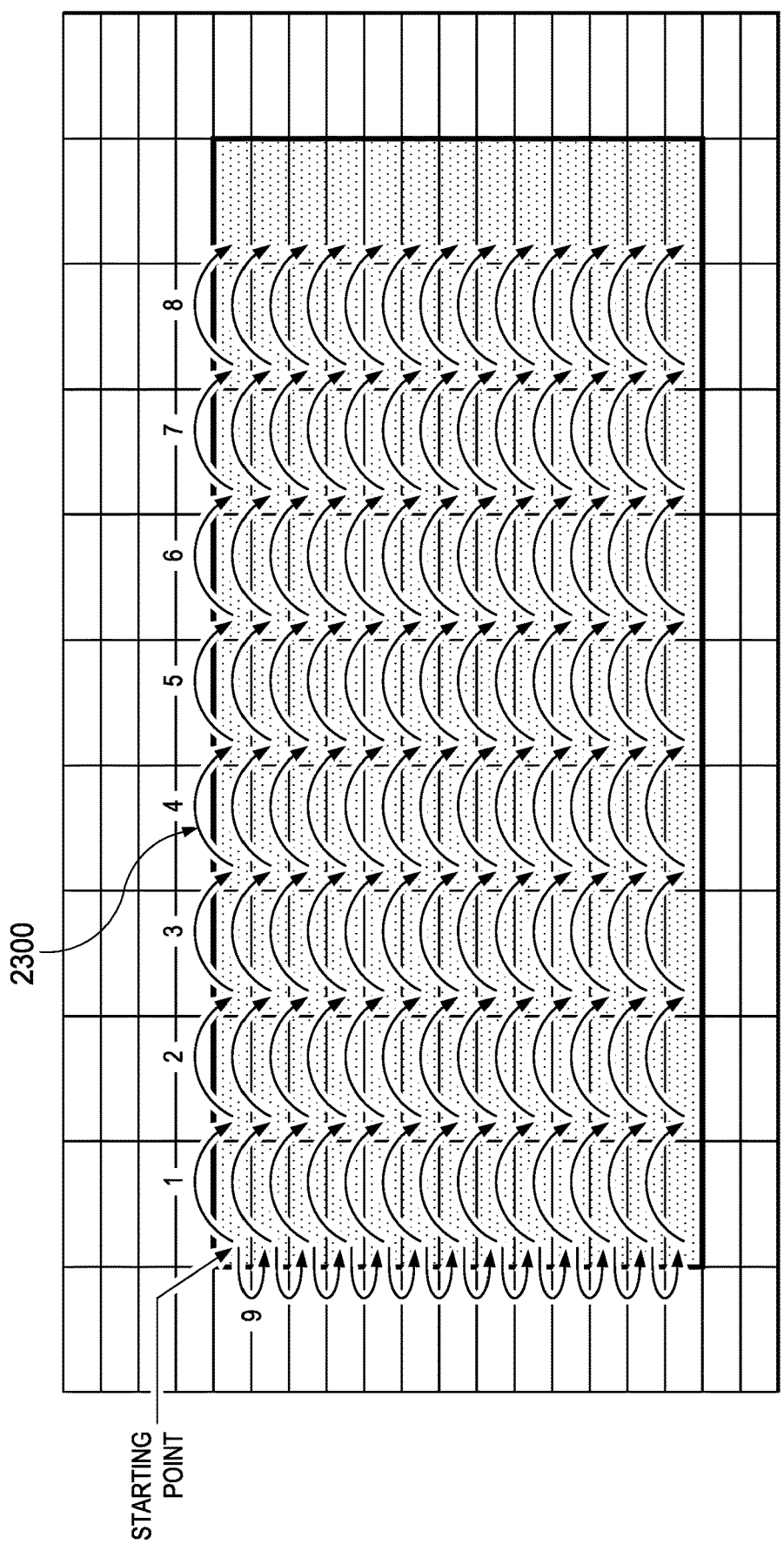
FIG. 23 illustrates the order of elements within the example stream of FIG. 21.

FIG. 23 illustrates the order of elements within this example stream. The streaming engine fetches elements for the stream in the order illustrated in order 2300. The first 9 elements come from the first row of rectangle 2220, left-to-right in hops 1 to 8. The 10th through 24th elements comes from the second row, and so on. When the stream moves from the 9th element to the 10th element (hop 9 in FIG. 23), the streaming engine computes the new location based on the pointer's position at the start of the inner loop, not where the pointer ended up at the end of the first dimension. This makes DIM1 independent of ELEM_BYTES and ICNT0. DIM1 always represents the distance between the first bytes of each consecutive row.

Figure 24:
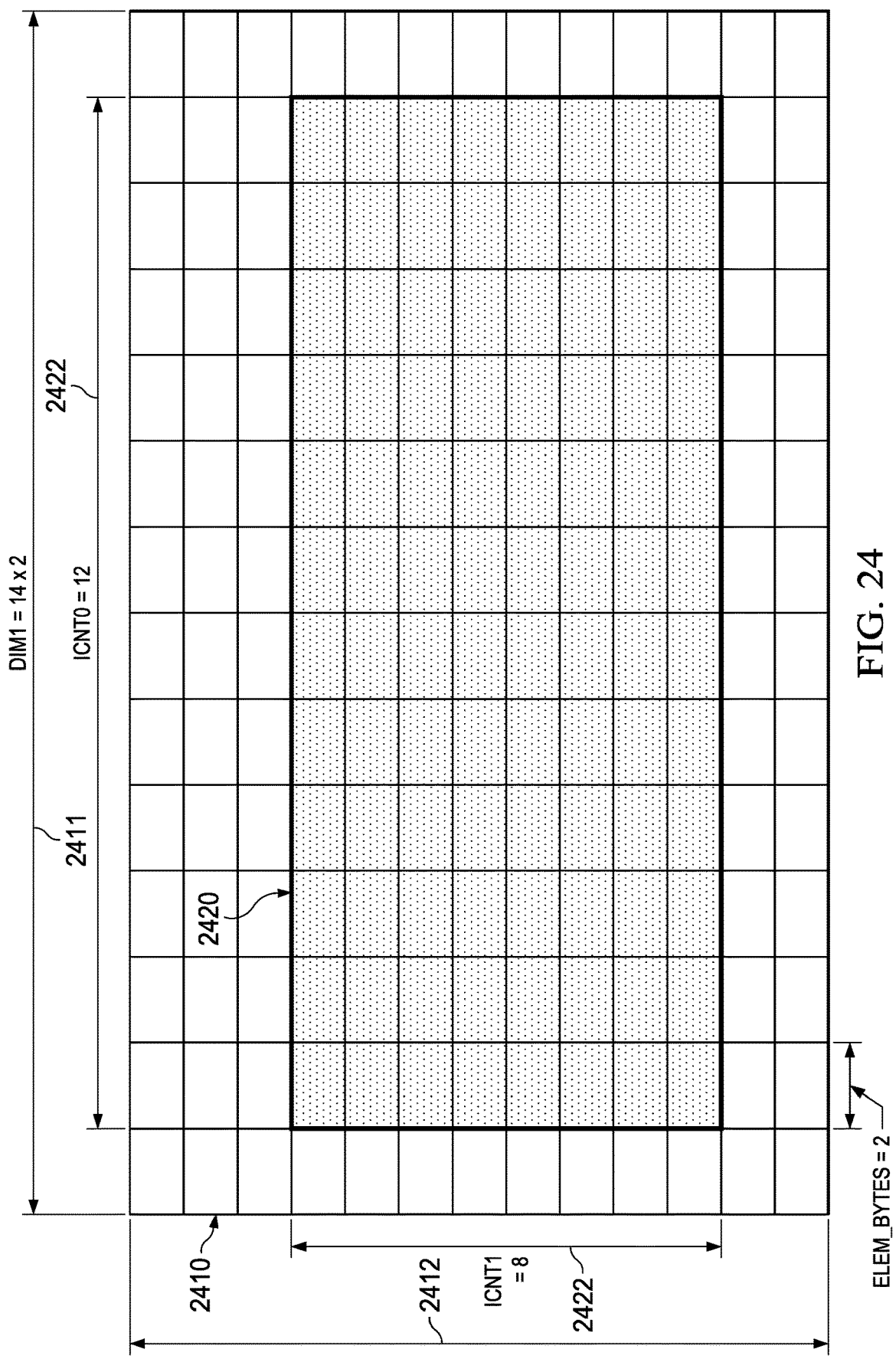
FIG. 24 illustrates extracting a smaller rectangle from a larger rectangle.

Transposed streams access along dimension 1 before dimension 0. The following examples illustrate a couple transposed streams, varying the transposition granularity. FIG. 24 illustrates extracting a smaller rectangle 2420 (12× 8) having dimensions 2421 and 2422 from a larger rectangle 2410 (14×13) having dimensions 2411 and 2412. In FIG. 24 ELEM_BYTES equals 2.

Figure 25:
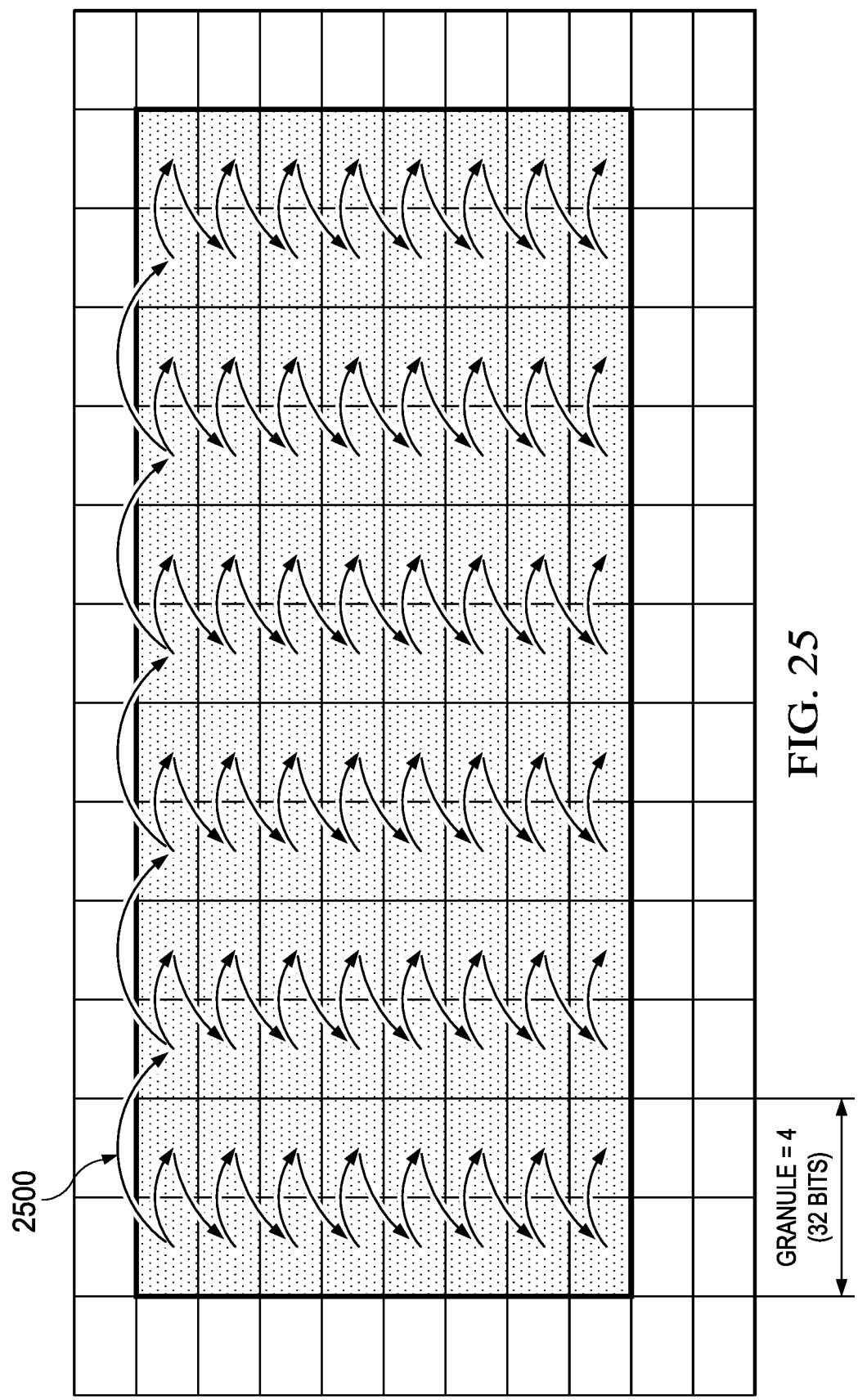
FIG. 25 illustrates how the streaming engine would fetch the stream of this example with a transposition granularity of 4 bytes.

FIG. 25 illustrates how the streaming engine would fetch the stream of this example with a transposition granularity of 4 bytes. Fetch pattern 2500 fetches pairs of elements from each row (because the granularity of 4 is twice the ELEM_BYTES of 2), but otherwise moves down the columns. Once it reaches the bottom of a pair of columns, it repeats this pattern with the next pair of columns.

Figure 26:
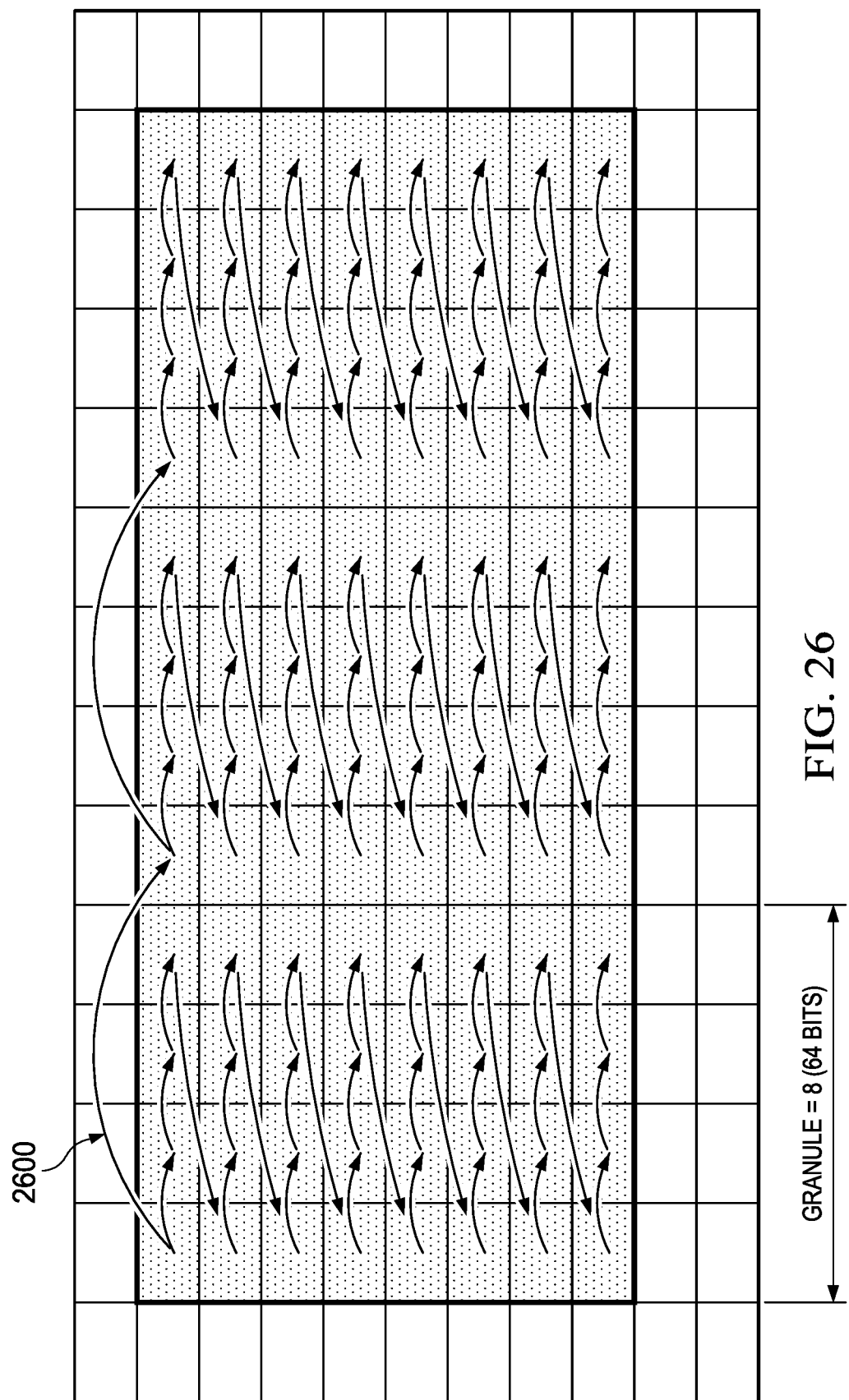
FIG. 26 illustrates how the streaming engine would fetch the stream of this example with a transposition granularity of 8 bytes.

FIG. 26 illustrates how the streaming engine would fetch the stream of this example with a transposition granularity of 8 bytes. The overall structure remains the same. The streaming engine fetches 4 elements from each row (because the granularity of 8 is four times the ELEM_BYTES of 2) before moving to the next row in the column as shown in fetch pattern 2600.

The streams examined so far read each element from memory exactly once. A stream can read a given element from memory multiple times, in effect looping over a piece of memory. FIR filters exhibit two common looping patterns. FIRs re-read the same filter taps for each output. FIRs also read input samples from a sliding window. Two consecutive outputs will need inputs from two overlapping windows.

Figure 27:
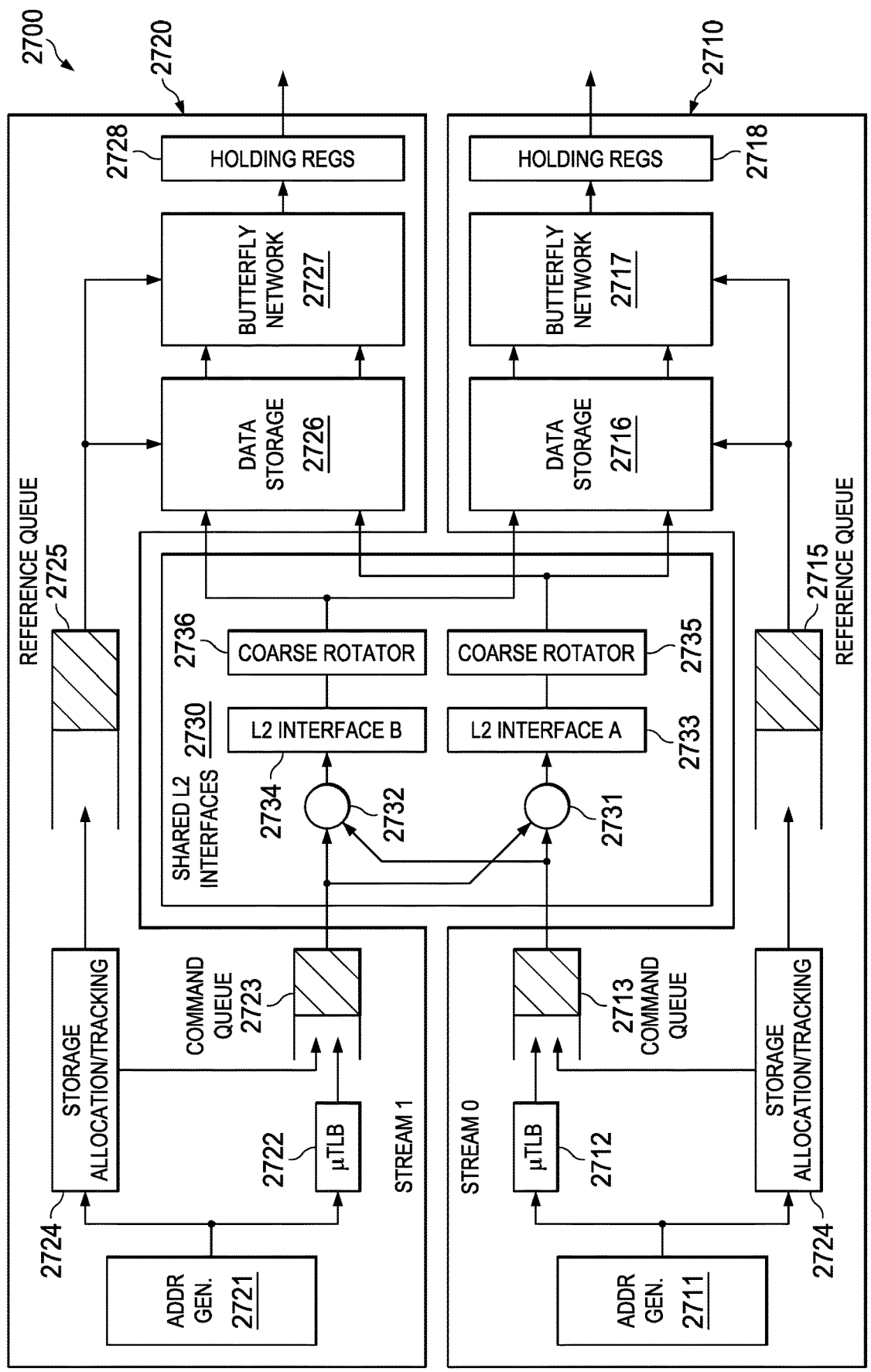
FIG. 27 illustrates the details of streaming engine of this invention.

FIG. 27 illustrates the details of streaming engine 2700. Streaming engine 2700 contains three major sections: Stream 0 2710; Stream 1 2720; and Shared L2 Interfaces 2730. Stream 0 2710 and Stream 1 2720 both contain identical hardware that operates in parallel. Stream 0 2710 and Stream 1 2720 both share L2 interfaces 2730. Each stream 2710 and 2720 provides central processing unit core 110 with up to 512 bits/cycle, every cycle. The streaming engine architecture enables this through its dedicated stream paths and shared dual L2 interfaces.

Each streaming engine 2700 includes a dedicated 6-dimensional stream address generator 2711/2721 that can each generate one new non-aligned request per cycle. Address generators 2711/2721 output 512-bit aligned addresses that overlap the elements in the sequence defined by the stream parameters. This will be further described below.

Each address generator 2711/2711 connects to a dedicated micro table look-aside buffer (μTLB) 2712/2722. The μTLB 2712/2722 converts a single 48-bit virtual address to a 44-bit physical address each cycle. Each μTLB 2712/2722 has 8 entries, covering a minimum of 32 kB with 4 kB pages or a maximum of 16 MB with 2 MB pages. Each address generator 2711/2721 generates 2 addresses per cycle. The μTLB 2712/2722 only translates 1 address per cycle. To maintain throughput, streaming engine 2700 takes advantage of the fact that most stream references will be within the same 4 kB page. Thus the address translation does not modify bits 0 to 11 of the address. If aout0 and aout1 line in the same 4 kB page (aout0[47:12] are the same as aout1 [47:12]), then the μTLB 2712/2722 only translates aout0 and reuses the translation for the upper bits of both addresses.

Translated addresses are queued in command queue 2713/2723. These addresses are aligned with information from the corresponding Storage Allocation and Tracking block 2714/2724. Streaming engine 2700 does not explicitly manage μTLB 2712/2722. The system memory management unit (MMU) invalidates μTLBs as necessary during context switches.

Storage Allocation and Tracking 2714/2724 manages the stream's internal storage, discovering data reuse and tracking the lifetime of each piece of data. This will be further described below.

Reference queue 2715/2725 stores the sequence of references generated by the corresponding address generator 2711/2721. This information drives the data formatting network so that it can present data to central processing unit core 110 in the correct order. Each entry in reference queue 2715/2725 contains the information necessary to read data out of the data store and align it for central processing unit core 110. Reference queue 2715/2725 maintains the following information listed in Table 5 in each slot:

TABLE 5

| | |
|---|---|
| Data Slot Low | Slot number for the lower half of data associated with aout0 |
| Data Slot High | Slot number for the upper half of data associated with aout1 |
| Rotation | Number of bytes to rotate data to align next element with lane 0 |
| Length | Number of valid bytes in this reference |

Storage allocation and tracking 2714/2724 inserts references in reference queue 2715/2725 as address generator 2711/2721 generates new addresses. Storage allocation and tracking 2714/2724 removes references from reference queue 2715/2725 when the data becomes available and there is room in the stream holding registers. As storage allocation and tracking 2714/2724 removes slot references from reference queue 2715/2725 and formats data, it checks whether the references represent the last reference to the corresponding slots. Storage allocation and tracking 2714/2724 compares reference queue 2715/2725 removal pointer against the slot's recorded Last Reference. If they match, then storage allocation and tracking 2714/2724 marks the slot inactive once it's done with the data.

Streaming engine 2700 has data storage 2716/2726 for an arbitrary number of elements. Deep buffering allows the streaming engine to fetch far ahead in the stream, hiding memory system latency. The right amount of buffering might vary from product generation to generation. In the current preferred embodiment streaming engine 2700 dedicates 32 slots to each stream. Each slot holds 64 bytes of data.

Butterfly network 2717/2727 consists of a 7 stage butterfly network. Butterfly network 2717/2727 receives 128 bytes of input and generates 64 bytes of output. The first stage of the butterfly is actually a half-stage. It collects bytes from both slots that match a non-aligned fetch and merges them into a single, rotated 64-byte array. The remaining 6 stages form a standard butterfly network. Butterfly network 2717/2727 performs the following operations: rotates the next element down to byte lane 0; promotes data types by one power of 2, if requested; swaps real and imaginary components of complex numbers, if requested; converts big endian to little endian if central processing unit core 110 is presently in big endian mode. The user specifies element size, type promotion and real/imaginary swap as part of the stream's parameters.

Streaming engine 2700 attempts to fetch and format data ahead of central processing unit core 110's demand for it, so that it can maintain full throughput. Holding registers 2718/

2728 provide a small amount of buffering so that the process remains fully pipelined. Holding registers 2718/2728 are not directly architecturally visible, except for the fact that streaming engine 2700 provides full throughput.

The two streams 2710/2720 share a pair of independent L2 interfaces 2730: L2 Interface A (IFA) 2733 and L2 Interface B (IFB) 2734. Each L2 interface provides 512 bits/cycle throughput direct to the L2 controller for an aggregate bandwidth of 1024 bits/cycle. The L2 interfaces use the credit-based multicore bus architecture (MBA) protocol. The L2 controller assigns each interface its own pool of command credits. The pool should have sufficient credits so that each interface can send sufficient requests to achieve full read-return bandwidth when reading L2 RAM, L2 cache and multicore shared memory controller (MSMC) memory (described below).

To maximize performance, both streams can use both L2 interfaces, allowing a single stream to send a peak command rate of 2 requests/cycle. Each interface prefers one stream over the other, but this preference changes dynamically from request to request. IFA 2733 and IFB 2734 always prefer opposite streams, when IFA 2733 prefers Stream 0, IFB 2734 prefers Stream 1 and vice versa.

Arbiter 2731/2732 ahead of each interface 2733/2734 applies the following basic protocol on every cycle it has credits available. Arbiter 2731/2732 checks if the preferred stream has a command ready to send. If so, arbiter 2731/2732 chooses that command. Arbiter 2731/2732 next checks if an alternate stream has at least two requests ready to send, or one command and no credits. If so, arbiter 2731/2732 pulls a command from the alternate stream. If either interface issues a command, the notion of preferred and alternate streams swap for the next request. Using this simple algorithm, the two interfaces dispatch requests as quickly as possible while retaining fairness between the two streams. The first rule ensures that each stream can send a request on every cycle that has available credits. The second rule provides a mechanism for one stream to borrow the other's interface when the second interface is idle. The third rule spreads the bandwidth demand for each stream across both interfaces, ensuring neither interface becomes a bottleneck by itself.

Coarse Grain Rotator 2735/2736 enables streaming engine 2700 to support a transposed matrix addressing mode. In this mode, streaming engine 2700 interchanges the two innermost dimensions of its multidimensional loop. This accesses an array column-wise rather than row-wise. Rotator 2735/2736 is not architecturally visible, except as enabling this transposed access mode.

Figures 28, 29:
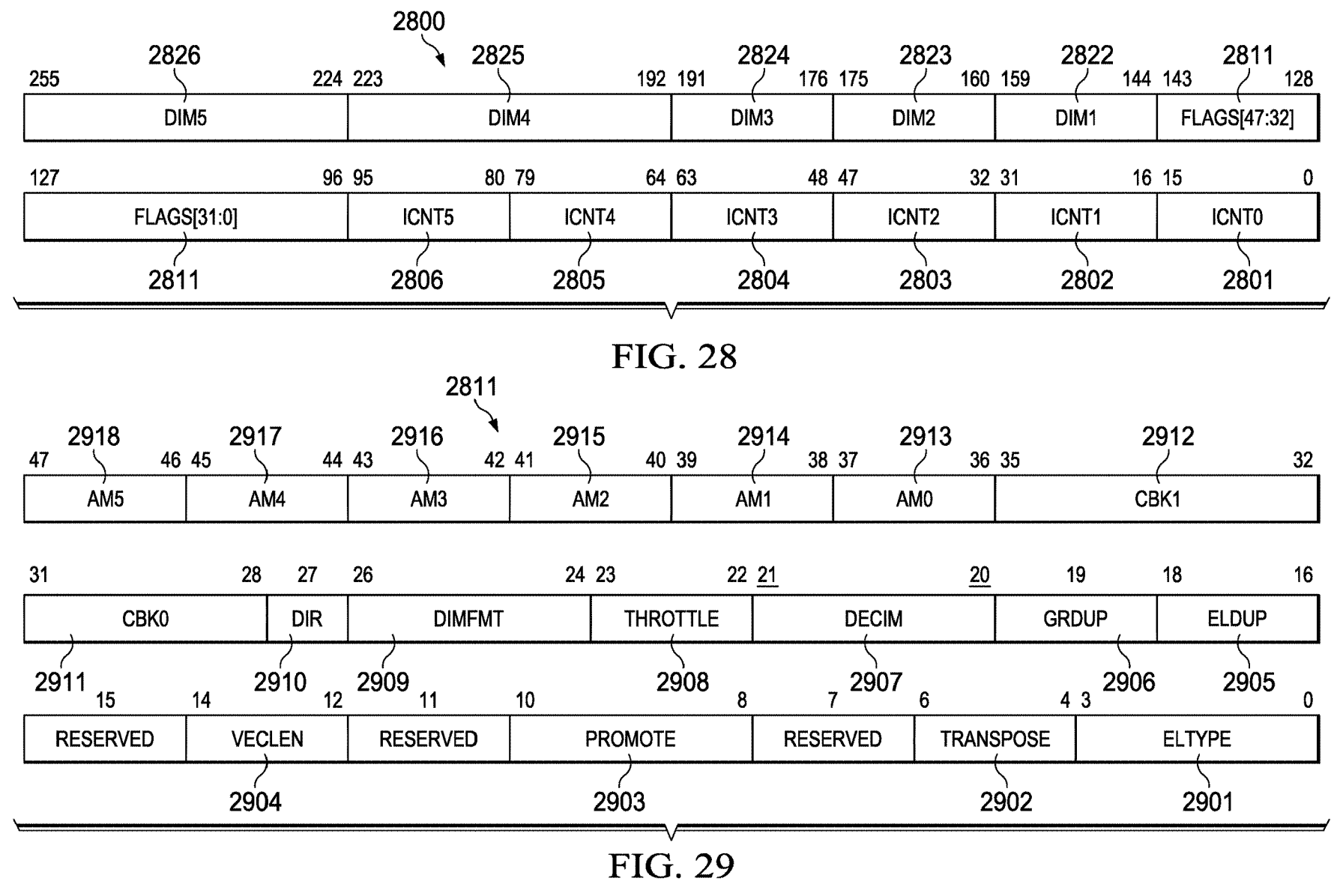

The stream definition template provides the full structure of a stream that contains data. The iteration counts and dimensions provide most of the structure, while the various flags provide the rest of the details. For all data-containing streams, the streaming engine defines a single stream template. All stream types it supports fit this template. The streaming engine defines a six-level loop nest for addressing elements within the stream. Most of the fields in the stream template map directly to the parameters in that algorithm. FIG. 28 illustrates stream template register 2800. The numbers above the fields are bit numbers within a 256-bit vector. Table 6 shows the stream field definitions of a stream template.

TABLE 6

| Field Name | FIG. 28 Reference Number | Description | Size Bits |
|---|---|---|---|
| ICNT0 | 2801 | Iteration count for loop 0 | 16 |
| ICNT1 | 2802 | Iteration count for loop 1 | 16 |
| ICNT2 | 2803 | Iteration count for loop 2 | 16 |
| ICNT3 | 2804 | Iteration count for loop 3 | 16 |
| ICNT4 | 2805 | Iteration count for loop 4 | 16 |
| INCT5 | 2806 | Iteration count for loop 5 | 16 |
| DIM1 | 2822 | Signed dimension for loop 1 | 16 |
| DIM2 | 2823 | Signed dimension for loop 2 | 16 |
| DIM3 | 2824 | Signed dimension for loop 3 | 16 |
| DIM4 | 2825 | Signed dimension for loop 4 | 32 |
| DIM4 | 2826 | Signed dimension for loop 5 | 32 |
| FLAGS | 2811 | Stream modifier flags | 48 |

Loop 0 is the innermost loop and loop 5 is the outermost loop. In the current example DIM0 is always equal to is ELEM_BYTES defining physically contiguous data. Thus the stream template register 2800 does not define DIM0. Streaming engine 2700 interprets all iteration counts as unsigned integers and all dimensions as unscaled signed integers. The template above fully specifies the type of elements, length and dimensions of the stream. The stream instructions separately specify a start address. This would typically be by specification of a scalar register in scalar register file 211 which stores this start address. This allows a program to open multiple streams using the same template.

FIG. 29 illustrates sub-field definitions of the flags field 2811. As shown in FIG. 29 the flags field 2811 is 6 bytes or 48 bits. FIG. 29 shows bit numbers of the fields. Table 7 shows the definition of these fields.

TABLE 7

| Field Name | FIG. 29 Reference Number | Description | Size Bits |
|---|---|---|---|
| ELTYPE | 2901 | Type of data element | 4 |
| TRANSPOSE | 2902 | Two dimensional transpose mode | 3 |
| PROMOTE | 2903 | Promotion mode | 3 |
| VCLEN | 2904 | Stream vector length | 3 |
| ELDUP | 2905 | Element duplication | 3 |
| GRDUP | 2906 | Group duplication | 1 |
| DECIM | 2907 | Element decimation | 2 |
| THROTTLE | 2908 | Fetch ahead throttle mode | 2 |
| DIMFMT | 2909 | Stream dimensions format | 3 |
| DIR | 2910 | Stream direction 0 forward direction 1 reverse direction | 1 |
| CBK0 | 2911 | First circular block size number | 4 |
| CBK1 | 2912 | Second circular block size number | 4 |
| AM0 | 2913 | Addressing mode for loop 0 | 2 |
| AM1 | 2914 | Addressing mode for loop 1 | 2 |
| AM2 | 2915 | Addressing mode for loop 2 | 2 |
| AM3 | 2916 | Addressing mode for loop 3 | 2 |
| AM4 | 2917 | Addressing mode for loop 4 | 2 |
| AM5 | 2918 | Addressing mode for loop 5 | 2 |

The Element Type (ELTYPE) field 2901 defines the data type of the elements in the stream. The coding of the four bits of the ELTYPE field 2901 is defined as shown in Table 8.

TABLE 8

| ELTYPE | Real/Complex | Sub-element Size Bits | Total Element Size Bits |
|---|---|---|---|
| 0000 | real | 8 | 8 |
| 0001 | real | 16 | 16 |
| 0010 | real | 32 | 32 |
| 0011 | real | 64 | 64 |
| 0100 | | reserved | |
| 0101 | | reserved | |
| 0110 | | reserved | |
| 0111 | | reserved | |
| 1000 | complex no swap | 8 | 16 |
| 1001 | complex no swap | 16 | 32 |
| 1010 | complex no swap | 32 | 64 |
| 1011 | complex no swap | 64 | 128 |
| 1100 | complex swapped | 8 | 16 |
| 1101 | complex swapped | 16 | 32 |
| 1110 | complex swapped | 32 | 64 |
| 1111 | complex swapped | 64 | 128 |

Real/Complex Type determines whether the streaming engine treats each element as a real number or two parts (real/imaginary or magnitude/angle) of a complex number. This field also specifies whether to swap the two parts of complex numbers. Complex types have a total element size that is twice their sub-element size. Otherwise, the sub-element size equals total element size.

Sub-Element Size determines the type for purposes of type promotion and vector lane width. For example, 16-bit sub-elements get promoted to 32-bit sub-elements when a stream requests type promotion. The vector lane width matters when central processing unit core 110 operates in big endian mode, as it always lays out vectors in little endian order.

Total Element Size determines the minimal granularity of the stream. In the stream addressing model, it determines the number of bytes the stream fetches for each iteration of the innermost loop. Streams always read whole elements, either in increasing or decreasing order. Therefore, the innermost dimension of a stream spans ICNT0×total-element-size bytes.

The TRANSPOSE field 2902 determines whether the streaming engine accesses the stream in a transposed order. The transposed order exchanges the inner two addressing levels. The TRANSPOSE field 2902 also indicated the granularity it transposes the stream. The coding of the three bits of the TRANSPOSE field 2902 is defined as shown in Table 9 for normal 2D operations.

TABLE 9

| Transpose | Meaning |
|---|---|
| 000 | Transpose disabled |
| 001 | Transpose on 8-bit boundaries |
| 010 | Transpose on 16-bit boundaries |
| 011 | Transpose on 32-bit boundaries |
| 100 | Transpose on 64-bit boundaries |
| 101 | Transpose on 128-bit boundaries |
| 110 | Transpose on 256-bit boundaries |
| 111 | Reserved |

Streaming engine 2700 may transpose data elements at a different granularity than the element size. This allows programs to fetch multiple columns of elements from each row. The transpose granularity must be no smaller than the element size. The TRANSPOSE field 2902 interacts with the DIMFMT field 2909 in a manner further described below.

The PROMOTE field 2903 controls whether the streaming engine promotes sub-elements in the stream and the type of promotion. When enabled, streaming engine 2700 promotes types by a powers-of-2 sizes. The coding of the three bits of the PROMOTE field 2903 is defined as shown in Table 10.

TABLE 10

| PROMOTE | Promotion Factor | Promotion Type | Resulting Sub-element Size | | | |
|---|---|---|---|---|---|---|
| | | | 8-bit | 16-bit | 32-bit | 64-bit |
| 000 | 1x | N/A | 8-bit | 16-bit | 32-bit | 64-bit |
| 001 | 2x | zero extend | 16-bit | 32-bit | 64-bit | Invalid |
| 010 | 4x | zero extend | 32-bit | 64-bit | Invalid | Invalid |
| 011 | 8x | zero extend | 64-bit | Invalid | Invalid | Invalid |
| 100 | | reserved | | | | |
| 101 | 2x | sign extend | 16-bit | 32-bit | 64-bit | Invalid |
| 110 | 4x | sign extend | 32-bit | 64-bit | Invalid | Invalid |
| 111 | 8x | sign extend | 64-bit | Invalid | Invalid | Invalid |

When PROMOTE is 000, corresponding to a 1× promotion, each sub-element is unchanged and occupies a vector lane equal in width to the size specified by ELTYPE. When PROMOTE is 001, corresponding to a 2× promotion and zero extend, each sub-element is treated as an unsigned integer and zero extended to a vector lane twice the width specified by ELTYPE. A 2× promotion is invalid for an initial sub-element size of 64 bits. When PROMOTE is 010, corresponding to a 4× promotion and zero extend, each sub-element is treated as an unsigned integer and zero extended to a vector lane four times the width specified by ELTYPE. A 4× promotion is invalid for an initial sub-element size of 32 or 64 bits. When PROMOTE is 011, corresponding to an 8× promotion and zero extend, each sub-element is treated as an unsigned integer and zero extended to a vector lane eight times the width specified by ELTYPE. An 8× promotion is invalid for an initial sub-element size of 16, 32 or 64 bits. When PROMOTE is 101, corresponding to a 2× promotion and sign extend, each sub-element is treated as a signed integer and sign extended to a vector lane twice the width specified by ELTYPE. A 2× promotion is invalid for an initial sub-element size of 64 bits. When PROMOTE is 110, corresponding to a 4× promotion and sign extend, each sub-element is treated as a signed integer and sign extended to a vector lane four times the width specified by ELTYPE. A 4× promotion is invalid for an initial sub-element size of 32 or 64 bits. When PROMOTE is 111, corresponding to an 8× promotion and zero extend, each sub-element is treated as a signed integer and sign extended to a vector lane eight times the width specified by ELTYPE. An 8× promotion is invalid for an initial sub-element size of 16, 32 or 64 bits.

The VECLEN field 2904 defines the stream vector length for the stream in bytes. Streaming engine 2700 breaks the stream into groups of elements that are VECLEN bytes long. The coding of the three bits of the VECLEN field 2904 is defined as shown in Table 11.

TABLE 11

| VECLEN | Stream Vector Length |
|---|---|
| 000 | 1 byte |
| 001 | 2 bytes |
| 010 | 4 bytes |
| 011 | 8 bytes |
| 100 | 16 bytes |
| 101 | 32 bytes |
| 110 | 64 bytes |
| 111 | Reserved |

VECLEN must be greater than or equal to the product of the element size in bytes and the duplication factor. Streaming engine 2700 presents the stream to central processing unit core 110 as either a sequence of pairs of single vectors or a sequence of double vectors. When VECLEN is shorter the native vector width of central processing unit core 110, streaming engine 2700 pads the extra lanes in the vector provided to central processing unit core 110. The GRDUP field 2906 determines the type of padding. The VECLEN field 2904 interacts with ELDUP field 2905 and GRDUP field 2906 in a manner detailed below.

The ELDUP field 2905 specifies a number of times to duplicate each element. The element size multiplied with the element duplication amount must not exceed the 64 bytes. The coding of the three bits of the ELDUP field 2905 is defined as shown in Table 12.

TABLE 12

| ELDUP | Duplication Factor |
|---|---|
| 000 | No Duplication |
| 001 | 2 times |
| 010 | 4 times |
| 011 | 8 times |
| 100 | 16 times |
| 101 | 32 times |
| 110 | 64 times |
| 111 | Reserved |

The ELDUP field 2905 interacts with VECLEN field 2904 and GRDUP field 2906 in a manner detailed below.

The GRDUP bit 2906 determines whether group duplication is enabled. If GRDUP bit 2906 is 0, then group duplication is disabled. If the GRDUP bit 2906 is 1, then group duplication is enabled. When enabled by GRDUP bit 2906, streaming engine 2700 duplicates a group of elements to fill the vector width. VECLEN field 2904 defines the length of the group to replicate. When VECLEN field 2904 is less than the vector length of central processing unit core 110 and GRDUP bit 2906 enables group duplication, streaming engine 2700 fills the extra lanes (see FIGS. 20 and 21) with additional copies of the stream vector. Because stream vector lengths and vector length of central processing unit core 110 are always powers of two, group duplication always produces a power of two of the number of duplicate copies. GRDUP field 2906 specifies how stream engine 2700 pads stream vectors out to the vector length of central processing unit core 110. When GRDUP bit 2906 is 0, streaming engine 2700 fills the extra lanes with zero and marks these extra vector lanes invalid. When GRDUP bit 2906 is 1, streaming engine 2700 fills extra lanes with copies of the group of elements in each stream vector. Setting GRDUP bit 2906 to 1 has no effect when VECLEN is set to the native vector width of central processing unit core 110.

The DECIM field 2907 controls data element decimation of the corresponding stream. Streaming engine 2700 deletes data elements from the stream upon storage in head registers 2718/2728 for presentation to the requesting functional unit. Decimation always removes whole data elements, not sub-elements. The DECIM field 2907 is defined as listed in Table 13.

TABLE 13

| DECIM | Decimation Factor |
|---|---|
| 00 | No Decimation |
| 01 | 2 times |
| 10 | 4 times |
| 11 | Reserved |

If DECIM field 2907 equals 00, then no decimation occurs. The data elements are passed to the corresponding head registers 2718/2728 without change. If DECIM field 2907 equals 01, then 2:1 decimation occurs. Streaming engine 2700 removes odd number elements from the data stream upon storage in the head registers 2718/2728. Limitations in the formatting network require 2:1 decimation to be employed with data promotion by at least 2× (PROMOTE cannot be 000), ICNT0 must be multiple of 2 and the total vector length (VECLEN) must be large enough to hold a single promoted, duplicated element. For transposed streams (TRANSPOSE≠0), the transpose granule must be at least twice the element size in bytes before promotion. If DECIM field 2907 equals 10, then 4:1 decimation occurs. Streaming engine 2700 retains every fourth data element removing three elements from the data stream upon storage in the head registers 2718/2728. Limitations in the formatting network require 4:1 decimation to be employed with data promotion by at least 4× (PROMOTE cannot be 000, 001 or 101), ICNT0 must be multiple of 4 and the total vector length (VECLEN) must be large enough to hold a single promoted, duplicated element. For transposed streams (TRANSPOSE≠0), decimation always removes columns, and never removes rows. Thus the transpose granule must be: at least twice the element size in bytes before promotion for 2:1 decimation (GRANULE≥2×ELEM_BYTES); and at least four times the element size in bytes before promotion for 4:1 decimation (GRANULE≥4×ELEM_BYTES).

The THROTTLE field 2908 controls how aggressively the streaming engine fetches ahead of central processing unit core 110. The coding of the two bits of this field is defined as shown in Table 14.

TABLE 14

| THROTTLE | Description |
|---|---|
| 00 | Minimum throttling, maximum fetch ahead |
| 01 | Less throttling, more fetch ahead |
| 10 | More throttling, less fetch ahead |
| 11 | Maximum throttling, minimum fetch ahead |

THROTTLE does not change the meaning of the stream, and serves only as a hint. The streaming engine may ignore this field. Programs should not rely on the specific throttle behavior for program correctness, because the architecture does not specify the precise throttle behavior. THROTTLE allows programmers to provide hints to the hardware about the program's own behavior. By default, the streaming engine attempts to get as far ahead of central processing unit core 110 as it can to hide as much latency as possible, while providing full stream throughput to central processing unit core 110. While several key applications need this level of throughput, it can lead to bad system level behavior for others. For example, the streaming engine discards all fetched data across context switches. Therefore, aggressive fetch-ahead can lead to wasted bandwidth in a system with large numbers of context switches. Aggressive fetch-ahead only makes sense in those systems if central processing unit core 110 consumes data very quickly.

The DIMFMT field 2909 enables redefinition of the loop count fields ICNT0 2801, ICNT1 2802, ICNT2 2803, ICNT3 2804, ICNT4 2805 and ICNT5 2806, the loop dimension fields DIM1 2855, DIM2 2823, DIM3 2824, DIM4 2825 and DIM5 2826 and the addressing mode fields AM0 2913, AM1 2914, AM2 2915, AM3 2916, AM4 2917 and AM5 2918 (part of FLAGS field 2811) of the stream template register 2800. This permits some loop dimension fields and loop counts to include more bits at the expense of fewer loops. Table 15 lists the size of the loop dimension fields for various values of the DIMFMT field 2909.

TABLE 15

| DIMFMT | Number of Loops | DIM5 | DIM4 | DIM3 | DIM2 | DIM1 |
|---|---|---|---|---|---|---|
| 000 | 3 | unused | 32 bits | unused | 32 bits | unused |
| 001 | 4 | unused | 32 bits | unused | 16 bits | 16 bits |
| 010 | 4 | unused | 32 bits | 16 bits | 16 bits | unused |
| 011 | 5 | unused | 32 bits | 32 bits | 32 bits | 16 bits |
| 100 | reserved | | | | | |
| 101 | reserved | | | | | |
| 110 | 6 | 16 bits | 16 bits | 32 bits | 32 bits | 32 bits |
| 111 | 6 | 32 bits | 32 bits | 16 bits | 16 bits | 32 bits |

Note that DIM0 always equals ELEM_BYTES the data element size. Table 16 lists the size of the loop count fields for various values of the DIMFMT field 2909.

TABLE 16

| DIMFMT | Number of Loops | ICNT5 | ICNT4 | ICNT3 | ICNT2 | ICNT1 | ICNT0 |
|---|---|---|---|---|---|---|---|
| 000 | 3 | unused | 32 bits | unused | 32 bits | unused | 32 bits |
| 001 | 4 | unused | 32 bits | unused | 32 bits | 16 bits | 16 bits |
| 010 | 4 | unused | 32 bits | 16 bits | 16 bits | unused | 32 bits |
| 011 | 5 | unused | 32 bits | 16 bits | 16 bits | 16 bits | 16 bits |
| 100 | reserved | | | | | | |
| 101 | reserved | | | | | | |
| 110 | 6 | 16 bits | 16 bits | 16 bits | 16 bits | 16 bits | 16 bits |
| 111 | 6 | 16 bits | 16 bits | 16 bits | 16 bits | 16 bits | 16 bits |

DIMFMT field 2909 effectively defines the loop dimension and loop count bits of stream template register 2800. FIG. 28 illustrates the default case when DIMFMT is 111.

Figure 30:
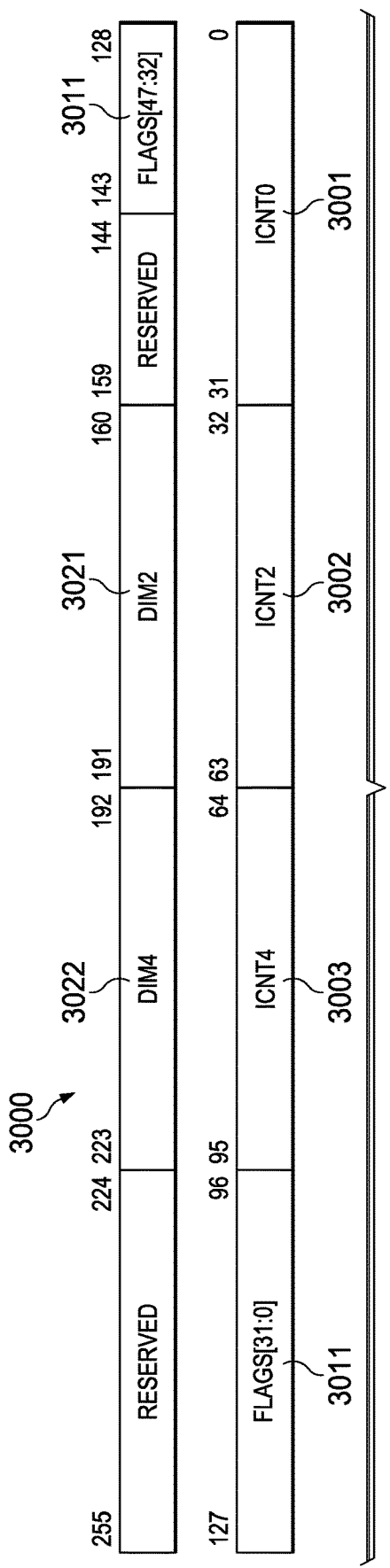
FIG. 30 illustrates a first alternate stream template register of this invention as specified by a dimension format field.

FIGS. 30 to 34 illustrate the definition of bits of the stream template register for other values of DIMFMT. Note the location and meaning of the FLAGS field (2811, 3011, 3111, 3211, 3311 and 3411) are the same for all values of DIMFMT FIG. 30 illustrates the definition of bits of the stream template register 3000 for a DIMFMT value of 000. For a DIMFMT value of 000, there are three loops: loop0, loop2 and loop4. For loop0 ICNT0 field 3001 includes bits 0 to 31 and DIM0 field equals ELEM_BYTES. For loop2 ICNT2 field 3002 includes bits 32 to 63 and DIM2 field 3021 includes bits 160 to 191. For loop4 ICNT4 field 3003 includes bits 64 to 95 and DIM4 field 3022 includes bits 192 to 223.

Figure 31:
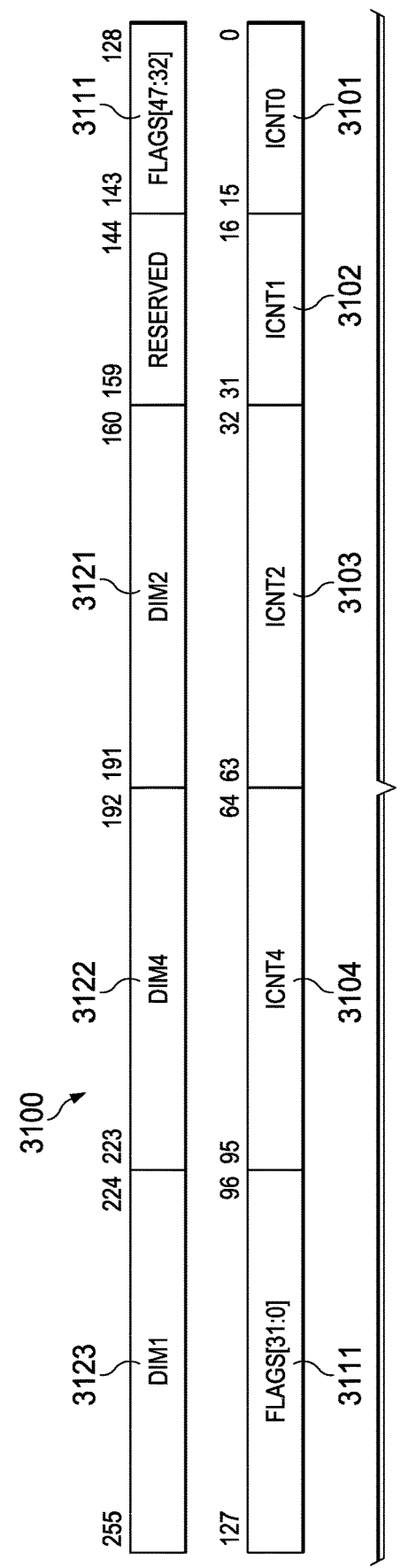
FIG. 31 illustrates a second alternate stream template register of this invention as specified by a dimension format field.

FIG. 31 illustrates the definition of bits of the stream template register 3100 for a DIMFMT value of 001. For a DIMFMT value of 001, there are four loops: loop0, loop1, loop2 and loop4. For loop0 ICNT0 field 3101 includes bits 0 to 16 and DIM0 field equals ELEM_BYTES. For loop1 ICNT1 field 3002 includes bits 16 to 31 and DIM1 field 3123 includes bits 224 to 255. For loop2 ICNT2 field 3103 includes bits 32 to 63 and DIM2 field 3121 includes bits 160 to 191. For loop4 ICNT4 field 3104 includes bits 64 to 95 and DIM4 field 3122 includes bits 192 to 223.

Figure 32:
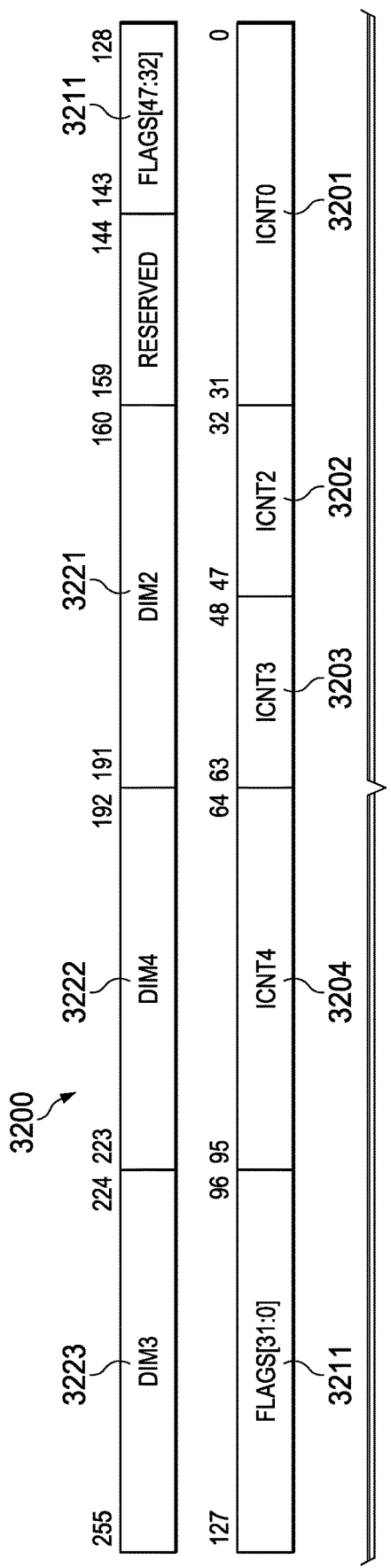
FIG. 32 illustrates a third alternate stream template register of this invention as specified by a dimension format field.

FIG. 32 illustrates the definition of bits of the stream template register 3200 for a DIMFMT value of 010. For a DIMFMT value of 010, there are four loops: loop0, loop2, loop3 and loop4. For loop0 ICNT0 field 3201 includes bits 0 to 32 and DIM0 field equals ELEM_BYTES. For loop2 ICNT2 field 3202 includes bits 32 to 47 and DIM2 field 3221 includes bits 160 to 191. For loop3 ICNT3 field 3203 includes bits 48 to 63 and DIM3 field 3223 includes bits 224 to 255. For loop4 ICNT4 field 3204 includes bits 64 to 95 and DIM4 field 3222 includes bits 192 to 223.

Figure 33:
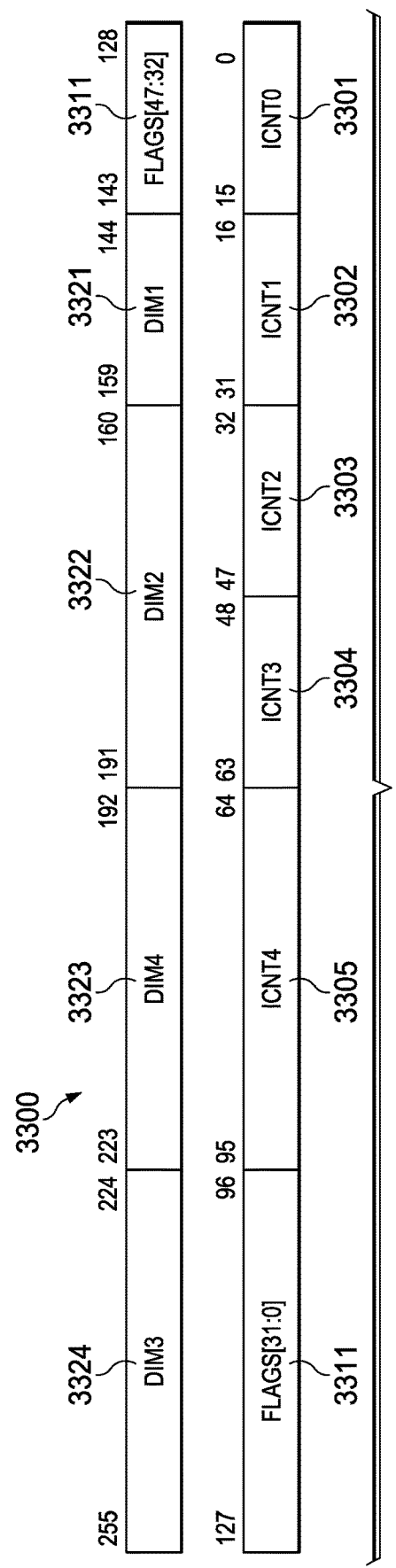
FIG. 33 illustrates a fourth alternate stream template register of this invention as specified by a dimension format field.

FIG. 33 illustrates the definition of bits of the stream template register 3300 for a DIMFMT value of 011. For a DIMFMT value of 011, there are five loops: loop0, loop1, loop2, loop3 and loop4. For loop0 ICNT0 field 3401 includes bits 0 to 15 and DIM0 field equals ELEM_BYTES. For loop1 ICNT1 field 3402 includes bits 16 to 31 and DIM1 field 3421 includes bits 144 to 159. For loop2 ICNT2 field 3403 includes bits 32 to 47 and DIM2 field 3221 includes bits 160 to 191. For loop3 ICNT3 field 3204 includes bits 48 to 63 and DIM3 field 3424 includes bits 224 to 255. For loop4 ICNT4 field 3405 includes bits 64 to 95 and DIM4 field 3423 includes bits 192 to 223.

Figure 34:
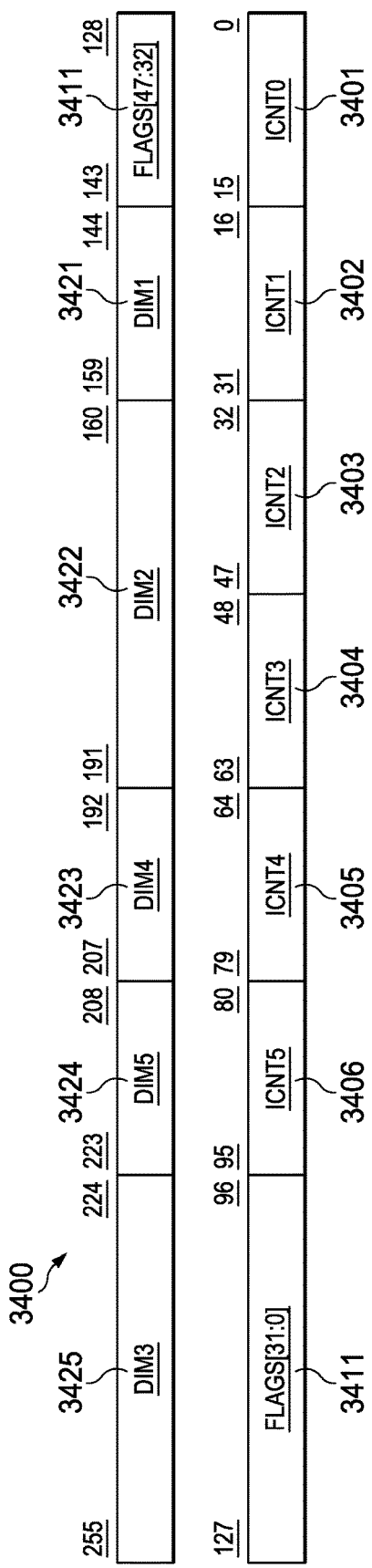
FIG. 34 illustrates a fifth alternate stream template register of this invention as specified by a dimension format field.

FIG. 34 illustrates the definition of bits of the stream template register 3400 for a DIMFMT value of 101. For a DIMFMT value of 110, there are six loops: loop0, loop1, loop2, loop3, loop4 and loop5. For loop0 ICNT0 field 3501 includes bits 0 to 15 and DIM0 field equals ELEM_BYTES. For loop1 ICNT1 field 3502 includes bits 16 to 31 and DIM1 field 3521 includes bits 144 to 159. For loop2 ICNT2 field 3503 includes bits 32 to and DIM2 field 3522 includes bits 160 to 191. For loop3 ICNT3 field 3504 includes bits 48 to 63 and DIM3 field 3525 includes bits 224 to 255. For loop4 ICNT4 field 3405 includes bits 64 to 79 and DIM4 field 3523 includes bits 192 to 207. For loop5 ICNT5 field 3506 includes bits 80 to 95 and DIM5 field 3524 includes bits 208 to 223.

The DIR bit 2910 determines the direction of fetch of the inner loop (Loop0). If the DIR bit 2910 is 0 then Loop0 fetches are in the forward direction toward increasing addresses. If the DIR bit 2910 is 1 then Loop0 fetches are in the backward direction toward decreasing addresses. The fetch direction of other loops is determined by the sign of the corresponding loop dimension DIM1, DIM2, DIM3, DIM4 and DIM5 which are signed integers.

The CBK0 field 2911 and the CBK1 field 2912 control the circular block size upon selection of circular addressing. The manner of determining the circular block size will be more fully described below.

The AM0 field 2913, AM1 field 2914, AM2 field 2915, AM3 field 2916, AM4 field 2917 and AM5 field 2918 control the addressing mode of a corresponding loop. This permits the addressing mode to be independently specified for each loop. Each of AM0 field 2913, AM1 field 2914, AM2 field 2915, AM3 field 2916, AM4 field 2917 and AM5 field 2918 are three bits and are decoded as listed in Table 17.

TABLE 17

| AMx field | Meaning |
| --- | --- |
| 000 | Linear addressing |
| 001 | Circular addressing block size set by CBK0 |
| 010 | Circular addressing block size set by CBK0 + CBK1 + 1 |
| 011 | reserved |

In linear addressing the address advances according to the address arithmetic whether forward or reverse. In circular addressing the address remains within a defined address block. Upon reaching the end of the circular address block the address wraps around to other limit of the block. Circular addressing blocks are typically limited to $2^N$ addresses where N is an integer. Circular address arithmetic may operate by cutting the carry chain between bits and not allowing a selected number of most significant bits to change. Thus arithmetic beyond the end of the circular block changes only the least significant bits.

The block size is set as listed in Table 18.

TABLE 18

| Encoded Block Size CBK0 or CBK0 + CBK1 + 1 | Block Size (bytes) |
| --- | --- |
| 0 | 512 |
| 1 | 1K |
| 2 | 2K |
| 3 | 4K |
| 4 | 8K |
| 5 | 16K |
| 6 | 32K |
| 7 | 64K |
| 8 | 128K |
| 9 | 256K |
| 10 | 512K |
| 11 | 1M |
| 12 | 2M |
| 13 | 4M |
| 14 | 8M |
| 15 | 16M |
| 16 | 32M |
| 17 | 64M |
| 18 | 128M |
| 19 | 256M |
| 20 | 512M |
| 21 | 1G |
| 22 | 2G |
| 23 | 4G |
| 24 | 8G |
| 25 | 16G |
| 26 | 32G |
| 27 | 64G |
| 28 | Reserved |
| 29 | Reserved |
| 30 | Reserved |
| 31 | Reserved |

In the preferred embodiment the circular block size is set by the number encoded by CBK0 (first circular address mode 01) or the number encoded by CBK0+CBK1+1 (second circular address mode 10). For example the first circular address mode, the circular address block size can be from 512 bytes to 16 M bytes. For the second circular address mode, the circular address block size can be from 1 K bytes to 64 G bytes. Thus the encoded block size is $2^{(B+9)}$ bytes, where B is the encoded block number which is CBK0 for the first block size (AMx of 01) and CBK0+CBK1+1 for the second block size (AMx of 10).

Figure 35:
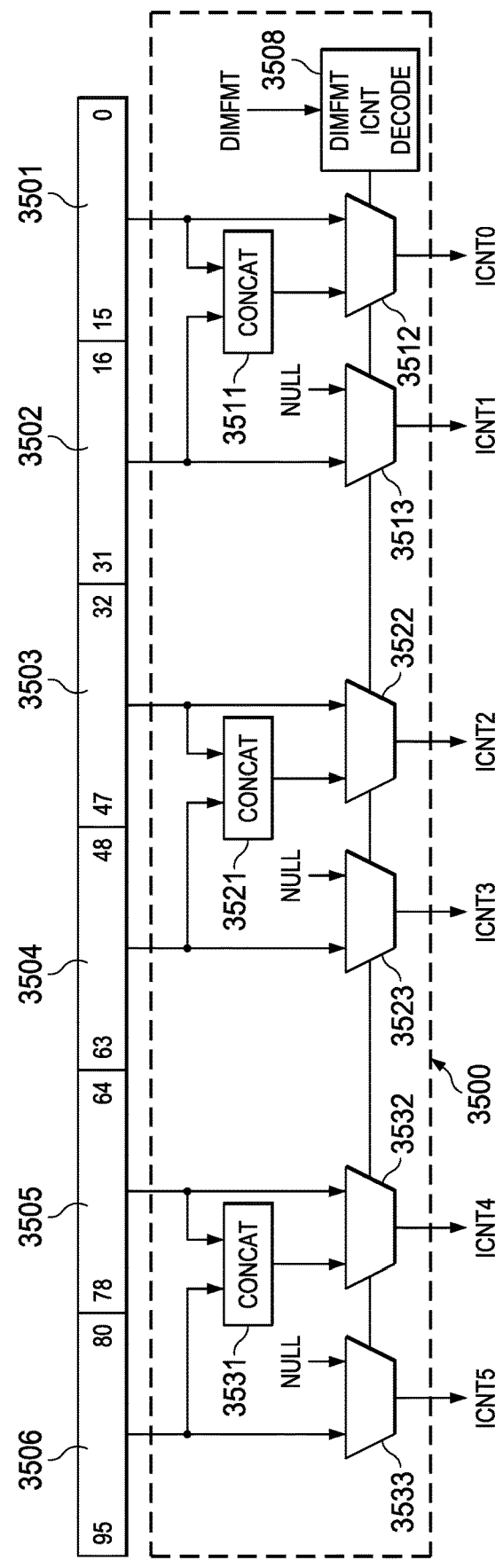
FIG. 35 illustrates a loop count selection circuit for selecting stream definition template bits for loop count for the plural nested loops as controlled by the dimensional format field.

FIG. 35 illustrates loop count selection circuit 3500 which is an exemplary embodiment selecting data from the stream template register for the various loop dimensions. As illustrated in FIGS. 28 and 30 to 34 the stream template register bits defining the loop counts vary dependent upon the DIMFMT field. FIG. 35 illustrates bits 0 to 95 of the stream template register. These bits are divided into 6 portions including: portion 3501, bits 0 to 15; portion 3502, bits 16 to 31; portion 3503, bits 32 to 47; portion 3504, bits 48 to 63; portion 3505, bits 64 to 79; and portion 3506, bits 80 to 95.

Concatenator 3511 forms a single 32-bit data word from portions 3501 and 3502. Multiplexer 3512 selects either portion 3501 or the output of concatenator 3511 for the INCT0 output. Multiplexer 3513 selects either a null input or portion 3502 for the INCT1 output.

Concatenator 3521 forms a single 32-bit data word from portions 3503 and 3504. Multiplexer 3522 selects either portion 3503 or the output of concatenator 3521 for the INCT2 output. Multiplexer 3523 selects either a null input or portion 3504 for the INCT3 output.

Concatenator 3531 forms a single 32-bit data word from portions 3505 and 3506. Multiplexer 3532 selects either portion 3505 or the output of concatenator 3531 for the INCT4 output. Multiplexer 3533 selects either a null input or portion 3506 for the INCT5 output.

DIMFMT ICNT decoder 3508 receives the DIMFT bits from the stream template register and generates outputs controlling the selections of multiplexers 3512, 3513, 3522, 3523, 3532 and 3533. Table 19 lists the control of these multiplexers for the various codings of the DIMFMT field.

TABLE 19

| DIMFMT | ICNT5 MUX 3533 | ICNT4 MUX 3532 | ICNT3 MUX 3523 | ICNT2 MUX 3522 | ICNT1 MUX 3513 | ICNT0 MUX 3512 |
| --- | --- | --- | --- | --- | --- | --- |
| 000 | Null | 3531 | Null | 3521 | Null | 3511 |
| 001 | Null | 3531 | Null | 3521 | 3502 | 3501 |
| 010 | Null | 3531 | 3504 | 3503 | Null | 3511 |
| 011 | Null | 3531 | 3504 | 3503 | 3502 | 3501 |
| 100 | | | reserved | | | |
| 101 | | | reserved | | | |
| 110 | 3506 | 3505 | 3504 | 3503 | 3502 | 3501 |
| 111 | 3506 | 3505 | 3504 | 3503 | 3502 | 3501 |

Figure 36:
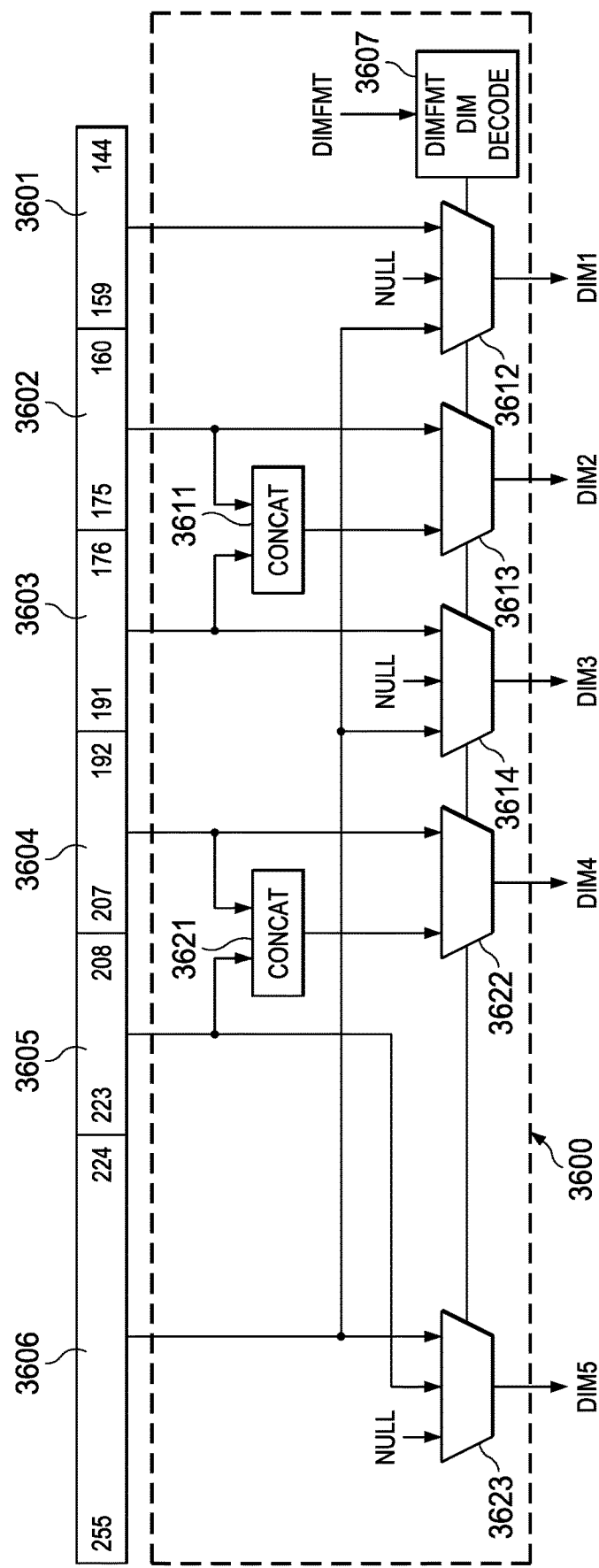
FIG. 36 illustrates a loop dimension selection circuit for selecting stream definition template bits for loop dimension for the plural nested loops as controlled by the dimensional format field.

FIG. 36 illustrates loop dimension selection circuit 3600 which is an exemplary embodiment selecting data from the stream template register for the various loop dimensions. Note that DIM0, the loop dimension of loop0, is always ELEN BYTES. As illustrated in FIGS. 28 and 30 to 34 the stream template register bits defining the loop dimension vary dependent upon the DIMFMT field. FIG. 36 illustrates bits 144 to 255 of the stream template register. These bits are divided into 6 portions including: portion 3601, bits 144 to 159; portion 3602, bits 160 to 175; portion 3603, bits 176 to 191; portion 3604, bits 192 to 207; portion 3605, bits 208 to 223; and portion 3606, bits 224 to 255.

Concatenator 3611 forms a single 32-bit data word from portions 3602 and 3603. Multiplexer 3612 selects either portion 3601, a null input or portion 3606 a DIM1 output. Multiplexer 3613 selects either portion 3602 of the output of concatenator 3611 for the DIM2 output. Multiplexer 3614 selects either portion 3604, a null input or portion 3606 for the DIM3 output.

Concatenator 3621 forms a single 32-bit data word from portions 3604 and 3605. Multiplexer 3622 selects either portion 3604 or the output of concatenator 3621 for the DIM4 output. Multiplexer 3623 selects either a null input, portion 3605 or portion 3606 for the DIM5 output.

DIMFMT DIM decoder 3607 receives the DIMFT bits from the stream template register and generates outputs controlling the selections of multiplexers 3612, 3613, 33614, 3622 and 353. Table 20 lists the control of these multiplexers for the various codings of the DIMFMT field.

TABLE 20

| DIMFMT | DIM5 MUX 3623 | DIM4 MUX 3622 | DIM3 MUX 3614 | DIM2 MUX 3613 | DIM1 MUX 3612 |
|---|---|---|---|---|---|
| 000 | Null | 3621 | Null | 3611 | Null |
| 001 | Null | 3621 | Null | 3611 | 3606 |
| 010 | Null | 3621 | 3606 | 3611 | Null |
| 011 | Null | 3621 | 3606 | 3611 | 3601 |
| 100 | | | reserved | | |
| 101 | | | reserved | | |
| 110 | 3605 | 3604 | 3606 | 3611 | 3601 |
| 111 | 3606 | 3621 | 3603 | 3602 | 3601 |

Figure 37:
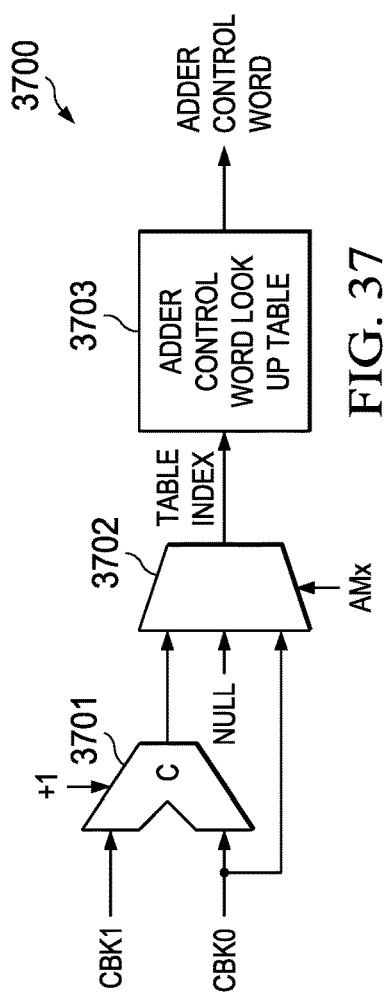
FIG. 37 illustrates an example of adder control word circuit which generates an adder control word for loop address generators controlling the selection of linear address mode and circular address mode.

FIG. 37 illustrates an example of adder control word circuit 3700 which generates an adder control word for loop address generators to be described below. The addressing mode fields AM0 2913, AM1 2914, AM2 2915, AM3 2916, AM4 2917 and AM5 2918 each control the addressing mode of a corresponding loop of the stream engine address. The address control word circuit 3700 is provided for each supported loop of the streaming engine address. Adder 3701 forms the sum of CBK0, CBK1 and 1. The fields CBK0 and CBK1 are each 4-bit fields and are part of the EFLAGS field of the corresponding stream template register. The fields CBK0 and CBK1 are supplied to the operand inputs of adder 3701. The quantity +1 is supplied to the carry-input of the least significant bit of adder 3701. This structure enables the three term addition without special adder hardware. The sum output of adder 3710 supplies one input of multiplexer 3702. A second input of multiplexer 3702 is a null. A third input of multiplexer 3701 is CBK0. Multiplexer 3702 is controlled by the AMx field for the corresponding loop. If AMx is 000, then multiplexer 3702 selects the null input. If AMx is 001, then multiplexer 3702 selects the CBK0 input. If AMx is 010, then multiplexer 3702 selects the sum CBK0+CBK1+1 output from adder 3701. The output of multiplexer 3702 is used as an index into adder control word look up table 3703. The adder control words accessed from adder control word look up table 3703 are used to control a corresponding loop adder (see FIG. 38) in manner similar to the SIMD control described above in conjunction with FIG. 18 and Table 3. The corresponding loop adder includes carry break circuits as illustrated in FIG. 18 following bits corresponding to the supported block sizes listed in Table 18. Adder control word look up table 3703 includes control words such as listed in Table 3 for the various block sizes. The selected number CBK0 or CBK0+CBK1+1 indexes the appropriate adder control word. If multiplexer 3702 selects the null input, corresponding to linear addressing, the corresponding adder control word is all 1's permitting adder carries between all address bits.

Figure 38:
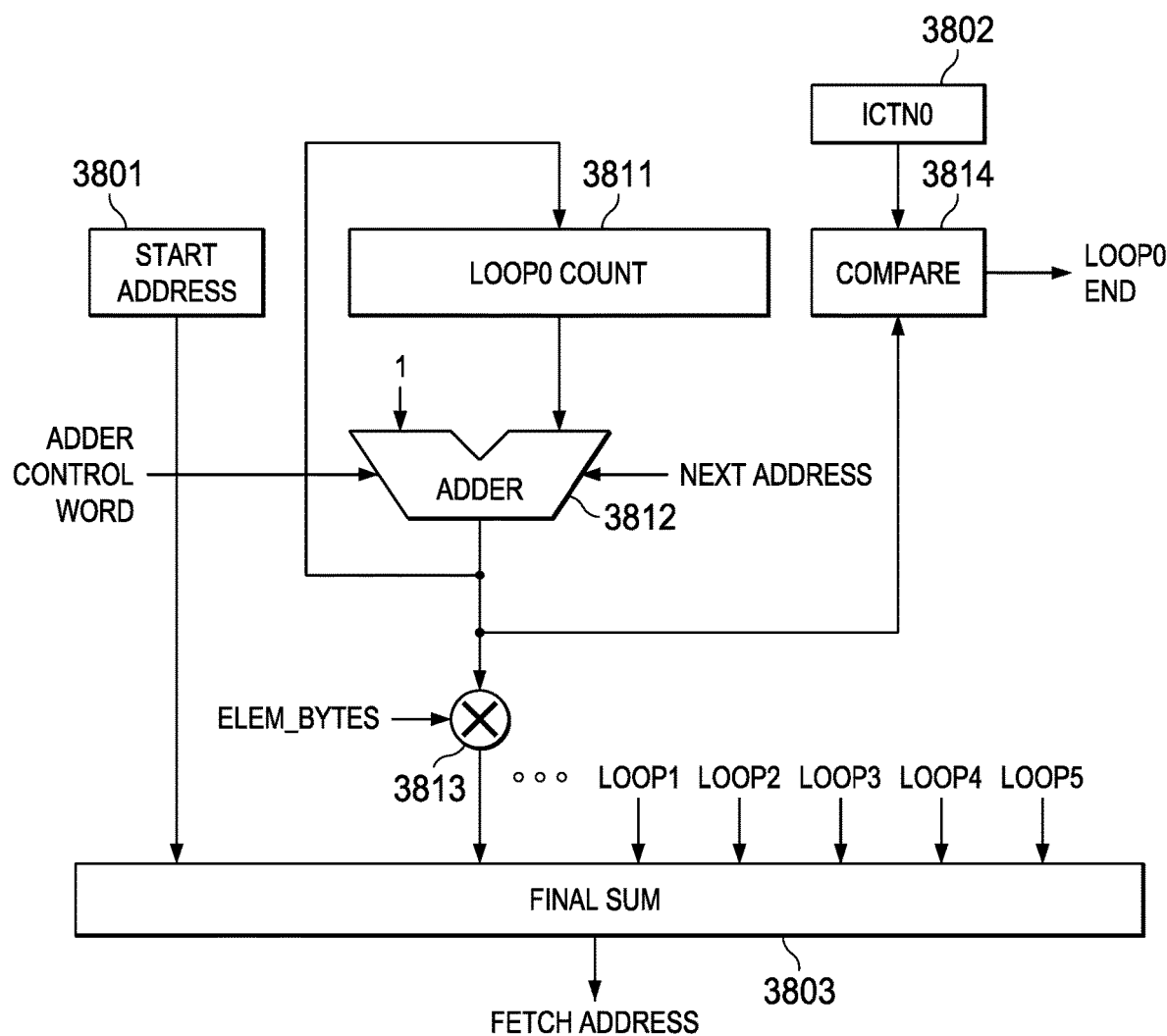
FIG. 38 is a partial schematic diagram illustrating address generation for the nested loops of this invention.

FIG. 38 illustrates a partial schematic view of a streaming engine 2700 address generator 3800. Address generator 3800 forms an address for fetching a next element in the defined stream of the corresponding streaming engine. Start address register 3801 stores a start address of the data stream. As previously described, start address register 3801 is preferably a scalar register in global scalar register file 211 designated by the STROPEN instruction that opened the corresponding stream. As known in the art, this start address may be copied from the specified scalar register and stored locally at the corresponding address generator 2711 OR 2721. A first loop of the stream employs Loop0 count register 3811, adder 3812, multiplier 3813 and comparator 3814. Loop0 count register 3811 stores the working copy of the iteration count of the first loop (Loop0). For each iteration of Loop0 adder 3812, as triggered by the Next Address signal, adds 1 to the loop count, which is stored back in Loop0 count register 3811. Multiplier 3813 multiplies the current loop count and the quantity ELEM_BYTES. ELEM_BYTES is the size of each data element in the loop in bytes. Loop0 traverses data elements physically contiguous in memory of the iteration step size is ELEM_BYTES.

Comparator 3814 compares the count stored in Loop0 count register 3811 (after incrementing by adder 3812) with the value of ICNT0 2801 from the corresponding stream template register 2800. As described above the loop0 count may be at portion 3001, portion 3101, portion 3201, portion 3301 or portion 3401 depending upon the state of the DIMFMT field 2909. When the output of adder 3812 equals the value of ICNT0 2801 of the stream template register 2800, an iteration of Loop® is complete. Comparator 3814 generates an active Loop® End signal. Loop® count register 3811 is reset to 0 and an iteration of the next higher loop, in this case Loop1, is triggered.

Circuits for the higher loops (Loop1, Loop2, Loop3, Loop4, Loop5) are similar to that illustrated in FIG. 38. Each loop includes a corresponding working loop count register, adder, multiplier and comparator. The adder of each loop is triggered by the loop end signal of the prior loop. The second input to each multiplier is the corresponding dimension DIM1, DIM2, DIM3, DIM4 and DIM5 of the corresponding stream template. The comparator of each loop compares the working loop register count with the corresponding iteration value ICNT1, ICTN2, ICTN3, ICTN4 and ICTN5 of the corresponding stream template register. A loop end signal generates an iteration of the next higher loop. A loop end signal from loop5 ends the stream.

FIG. 38 illustrates adder 3812 receiving an adder control word. As described above this adder control word is all 1's for linear addressing and has a 0 at the appropriate location for circular addressing. The location of the 0 in the adder control word corresponding to the circular block size of the circular addressing mode.

The central processing unit core 110 exposes the streaming engine to programs through a small number of instructions and specialized registers. A STROPEN instruction opens a stream. The STROPEN command specifies a stream number indicating opening stream 0 or stream 1. The STROPEN specifies a stream template register which stores the stream template as described above. The arguments of the STROPEN instruction are listed in Table 21.

TABLE 21

| Argument | Description |
| --- | --- |
| Stream Start Address Register | Scaler register storing stream start address |
| Steam Number | Stream 0 or Stream 1 |
| Stream Template Register | Vector register storing stream template data |

The stream start address register is preferably a scalar register in general scalar register file 211. The STROPEN instruction specifies stream 0 or stream 1 by its opcode. The stream template register is preferably a vector register in general vector register file 221. If the specified stream is active the STROPEN instruction closes the prior stream and replaces the stream with the specified stream.

A STRCLOSE instruction closes a stream. The STRCLOSE command specifies the stream number of the stream to be closed.

A STRSAVE instruction captures sufficient state information of a specified stream to restart that stream in the future. A STRRSTR instruction restores a previously saved stream. A STRSAVE instruction does not save any of the data of the stream. A STRSAVE instruction saves only metadata. The stream re-fetches data in response to a STRRSTR instruction.

Streaming engine is in one of three states: Inactive; Active; or Frozen. When inactive the streaming engine does nothing. Any attempt to fetch data from an inactive streaming engine is an error. Until the program opens a stream, the streaming engine is inactive. After the program consumes all the elements in the stream or the program closes the stream, the streaming engine also becomes inactive. Programs which use streams explicitly activate and inactivate the streaming engine. The operating environment manages streams across context-switch boundaries via the streaming engine's implicit freeze behavior, coupled with its own explicit save and restore actions.

Active streaming engines have a stream associated with them. Programs can fetch new stream elements from active streaming engines. Streaming engines remain active until one of the following. When the stream fetches the last element from the stream, it becomes inactive. When program explicitly closes the stream, it becomes inactive. When central processing unit core 110 responds to an interrupt or exception, the streaming engine freezes. Frozen streaming engines capture all the state necessary to resume the stream where it was when the streaming engine froze. The streaming engines freeze in response to interrupts and exceptions. This combines with special instructions to save and restore the frozen stream context, so that operating environments can cleanly switch contexts. Frozen streams reactivate when central processing unit core 110 returns to the interrupted context.

Figure 39:
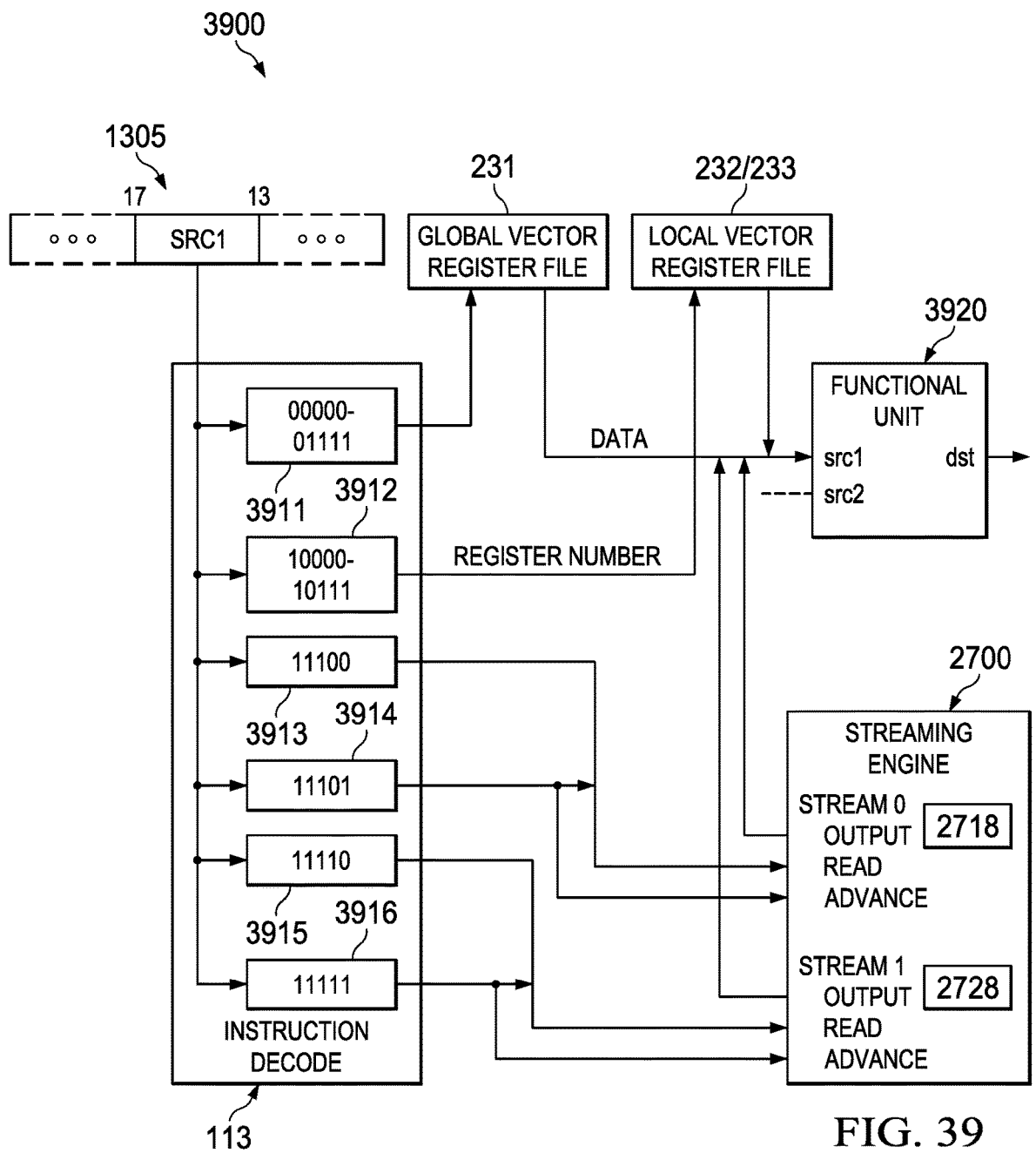
FIG. 39 illustrates a partial schematic diagram showing the streaming engine supply of operands of this invention.

FIG. 39 is a partial schematic diagram 3900 illustrating the stream input operand coding described above. FIG. 39 illustrates decoding src1 field 1305 of one instruction of a corresponding src1 input of functional unit 3920. These same circuits are duplicated for src2/cst field 1304 and the src2 input of functional unit 3920. In addition, these circuits are duplicated for each instruction within an execute packet that can be dispatched simultaneously.

Instruction decoder 113 receives bits 13 to 17 comprising src1 field 1305 of an instruction. The opcode field opcode field (bits 4 to 12 for all instructions and additionally bits 28 to 31 for unconditional instructions) unambiguously specifies a corresponding functional unit 3920. In this embodiment functional unit 3920 could be L2 unit 241, S2 unit 242, M2 unit 243, N2 unit 244 or C unit 245. The relevant part of instruction decoder 113 illustrated in FIG. 39 decodes src1 bit field 1305. Sub-decoder 3911 determines whether src1 bit field 1305 is in the range from 00000 to 01111. If this is the case, sub-decoder 3911 supplies a corresponding register number to global vector register file 231. In this example this register field is the four least significant bits of src1 bit field 1305. Global vector register file 231 recalls data stored in the register corresponding to this register number and supplies this data to the src1 input of functional unit 3920. This decoding is generally known in the art.

Sub-decoder 3912 determines whether src1 bit field 1305 is in the range from 10000 to 10111. If this is the case, sub-decoder 3912 supplies a corresponding register number to the corresponding local vector register file. If the instruction is directed to L2 unit 241 or S2 unit 242, the corresponding local vector register file is local vector register field 232. If the instruction is directed to M2 unit 243, N2 unit 244 or C unit 245, the corresponding local vector register file is local vector register field 233. In this example this register field is the three least significant bits of src1 bit field 1305. The corresponding local vector register file 232/233 recalls data stored in the register corresponding to this register number and supplies this data to the src1 input of functional unit 3920. This decoding is generally known in the art.

Sub-decoder 3913 determines whether src1 bit field 1305 is 11100. If this is the case, sub-decoder 3913 supplies a stream 0 read signal to streaming engine 2700. Streaming engine 2700 then supplies stream 0 data stored in holding register 2718 to the src1 input of functional unit 3920.

Sub-decoder 3914 determines whether src1 bit field 1305 is 11101. If this is the case, sub-decoder 3914 supplies a stream 0 read signal to streaming engine 2700. Streaming engine 2700 then supplies stream 0 data stored in holding register 2718 to the src1 input of functional unit 3920. Sub-decoder 3914 also supplies an advance signal to stream 0. As previously described, streaming engine 2700 advances to store the next sequential data elements of stream 0 in holding register 2718.

Sub-decoder 3915 determines whether src1 bit field 1305 is 11110. If this is the case, sub-decoder 3915 supplies a stream 1 read signal to streaming engine 2700. Streaming engine 2700 then supplies stream 1 data stored in holding register 2728 to the src1 input of functional unit 3920.

Sub-decoder 3916 determines whether src1 bit field 1305 is 11111. If this is the case, sub-decoder 3916 supplies a stream 1 read signal to streaming engine 2700. Streaming engine 2700 then supplies stream 1 data stored in holding register 2728 to the src1 input of functional unit 3920. Sub-decoder 3914 also supplies an advance signal to stream 1. As previously described, streaming engine 2700 advances to store the next sequential data elements of stream 1 in holding register 2728.

Similar circuits are used to select data supplied to scr2 input of functional unit 3902 in response to the bit coding of src2/cst field 1304. The src2 input of functional unit 3920 may be supplied with a constant input in a manner described above.

The exact number of instruction bits devoted to operand specification and the number of data registers and streams are design choices. Those skilled in the art would realize that other number selections that described in the application are feasible. In particular, the specification of a single global vector register file and omission of local vector register files is feasible. This invention employs a bit coding of an input operand selection field to designate a stream read and another bit coding to designate a stream read and advancing the stream.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A device comprising:
   a template register configured to store a stream definition template that includes a respective count for each loop of a plurality of nested loops, wherein each of the respective counts is independent of a remainder of the respective counts; and
   a memory unit coupled to the template register and configured to couple to a memory and a processor, wherein the memory unit is configured to:
     receive an instruction from the processor that specifies at least one of: a number of bits in the template register allocated to each of the respective counts of the plurality of nested loops or a number of bits in the template register allocated to specify a distance between pointer positions of each loop of the plurality of nested loops;
     based on the instruction, retrieve a set of data elements from the memory by:
       generating a set of addresses for the set of data elements by traversing the plurality of nested loops according to the respective counts in the stream definition template; and
       retrieving the set of data elements from the memory according to the set of addresses; and
     provide the set of data elements to the processor.

2. The device of claim 1, wherein the stream definition template includes a format field that specifies the number of bits in the template register allocated for each of the respective counts.

3. The device of claim 2, wherein:
   a first value of the format field specifies that a first number of bits is allocated for a first count of the respective counts and a second number of bits is allocated for a second count of the respective counts; and
   the first number of bits is different from the second number of bits.

4. The device of claim 2, wherein the format field further specifies a count of loops within the plurality of nested loops.

5. The device of claim 1, wherein the stream definition template includes a direction bit that specifies whether a first loop of the plurality of nested loops increases or decreases in address as the memory unit traverses the plurality of nested loops.

6. The device of claim 1, wherein each of the respective counts has a sign that indicates whether the respective loop of the plurality of nested loops increases or decrease in address as the memory unit traversed the plurality of nested loops.

7. The device of claim 1, wherein:
   the stream definition template further includes a respective loop dimension for each loop of the plurality of nested loops that specifies the distance between pointer positions of the respective loop, wherein each of the respective loop dimensions is independent of a remainder of the respective loop dimensions; and
   the generating of the set of addresses by the memory unit further traverses the plurality of nested loops according to the respective loop dimensions in the stream definition template.

8. The device of claim 7, wherein the stream definition template includes a format field that specifies a number of bits in the template register allocated for each of the respective loop dimensions.

9. The device of claim 1, wherein:
   the stream definition template further includes a respective address mode field for each loop of the plurality of nested loops, wherein:
   each of the respective address mode fields specifies whether the respective loop uses linear addressing or circular addressing; and
   each of the respective address mode fields is independent of a remainder of the respective address mode fields.

10. The device of claim 9, wherein each of the respective address mode fields is configured to specify a field of the template register to determine a block size associated with the circular addressing of the respective loop of the plurality of nested loops.

11. The device of claim 9, wherein a first value of a first address mode field of the respective address mode fields specifies to add a value in first field of the template register and a value in a second field of the template register to determine a block size associated with the circular addressing of the respective loop of the plurality of nested loops.

12. The device of claim 1, wherein the memory is a level-two (L2) cache memory, and the memory unit is configured to bypass a level-one (L1) cache memory.

13. A device comprising:
    a processor that includes a vector datapath;
    a stream template register configured to store a stream definition template that includes a respective count for each loop of a plurality of nested loops; and
    a streaming engine coupled to the processor and the stream template register and configured to couple to a memory, wherein the streaming engine is configured to:
      receive a stream start instruction from the processor that specifies at least one of: a number of bits in the stream template register allocated to each of the respective counts of the plurality of nested loops or a number of bits in the stream template register allocated to specify a distance between pointer positions of each loop of the plurality of nested loops;

based on the stream start instruction, retrieve a set of data elements from the memory by:
  generating a set of addresses for the set of data elements by traversing the plurality of nested loops according to the respective counts in the stream definition template; and
  retrieving the set of data elements from the memory according to the set of addresses; and
provide the set of data elements to the vector datapath of the processor.

14. The device of claim 13, wherein the stream definition template includes a format field that specifies the number of bits in the template register allocated for each of the respective counts.

15. The device of claim 14, wherein:
a first value of the format field specifies that a first number of bits is allocated for a first count of the respective counts and a second number of bits is allocated for a second count of the respective counts; and
the first number of bits is different from the second number of bits.

16. The device of claim 14, wherein the format field further specifies a count of loops within the plurality of nested loops.

17. The device of claim 13, wherein:
the stream definition template further includes a respective loop dimension for each loop of the plurality of nested loops that specifies the distance between pointer positions of the respective loop; and
the generating of the set of addresses by the streaming engine further traverses the plurality of nested loops according to the loop dimensions in the stream definition template.

18. The device of claim 17, wherein the stream definition template includes a format field that specifies a number of bits in the template register allocated for each of the respective loop dimensions.

19. The device of claim 13, wherein the memory is a level-two (L2) cache memory, and the streaming engine is configured to bypass a level-one (L1) cache memory.

20. The device of claim 13, further comprising the memory.

* * * * *